(12) United States Patent
Hudgens

US009527003B2

(10) Patent No.: US 9,527,003 B2
(45) Date of Patent: Dec. 27, 2016

(54) SUBTERRANEAN WELL PRODUCTION SALTWATER EVAPORATION STATION WITH IODINE SEPARATOR

(71) Applicant: Hudgens Holdings, LLC, Saginaw, TX (US)

(72) Inventor: Dennis Hudgens, Saginaw, TX (US)

(73) Assignee: Hudgens Holdings, LLC, Saginaw, TX (US)

( * ) Notice: Subject to any disclaimer, the term of this patent is extended or adjusted under 35 U.S.C. 154(b) by 56 days.

(21) Appl. No.: 14/660,469

(22) Filed: Mar. 17, 2015

(65) Prior Publication Data

US 2015/0190728 A1    Jul. 9, 2015

Related U.S. Application Data

(63) Continuation-in-part of application No. 14/188,283, filed on Feb. 24, 2014, now Pat. No. 9,005,310, which is a continuation-in-part of application No. 13/532,500, filed on Jun. 25, 2012, now Pat. No. 8,703,065, which is a continuation-in-part of application No. 12/476,438, filed on Jun. 2, 2009, now Pat. No. 8,226,735.

(51) Int. Cl.

| B01D 9/00 | (2006.01) |
|---|---|
| B01D 1/18 | (2006.01) |
| B01D 1/00 | (2006.01) |
| B01D 17/02 | (2006.01) |
| B01D 21/02 | (2006.01) |
| C02F 1/12 | (2006.01) |
| B01D 5/00 | (2006.01) |
| B01D 21/00 | (2006.01) |
| B01D 21/01 | (2006.01) |
| C01B 7/14 | (2006.01) |
| C02F 1/42 | (2006.01) |
| C02F 101/32 | (2006.01) |
| C02F 101/12 | (2006.01) |
| C02F 1/04 | (2006.01) |
| C02F 1/14 | (2006.01) |
| C02F 1/40 | (2006.01) |

(52) U.S. Cl.
CPC ............ *B01D 1/18* (2013.01); *B01D 1/0082* (2013.01); *B01D 5/006* (2013.01); *B01D 5/0006* (2013.01); *B01D 17/0214* (2013.01); *B01D 21/009* (2013.01); *B01D 21/01* (2013.01); *B01D 21/02* (2013.01); *C01B 7/14* (2013.01); *C02F 1/12* (2013.01); *C02F 1/048* (2013.01); *C02F 1/14* (2013.01); *C02F 1/40* (2013.01); *C02F 1/42* (2013.01); *C02F 2001/422* (2013.01); *C02F 2101/12* (2013.01); *C02F 2101/32* (2013.01); *Y02W 10/37* (2015.05)

(58) Field of Classification Search
CPC ................. B01D 9/00; B01J 8/00; B01J 10/00
USPC ............ 23/303, 296, 295 R; 423/179, 206.1; 422/245.1, 608
See application file for complete search history.

(56) References Cited

U.S. PATENT DOCUMENTS

| 3,779,030 A | 12/1973 | Best |
| 5,207,928 A | 5/1993 | Lerner |
| 6,340,373 B1 | 1/2002 | Billington |
| 8,226,735 B2 | 7/2012 | Hudgens |
| 8,703,065 B2 | 4/2014 | Hudgens |
| 9,005,310 B2 * | 4/2015 | Hudgens .................. 23/303 |
| 2002/0054841 A1 * | 5/2002 | Nakashima ............ B01D 53/50 423/179 |

OTHER PUBLICATIONS

Notice of Allowance dated Dec. 18, 2013, 13 pages, U.S. Appl. No. 13/532,500, filed Jun. 25, 2012.
Office Action dated Dec. 16, 2011, 7 pages, U.S. Appl. No. 12/476,438, filed Jun. 2, 2009.
Office Action dated Oct. 28, 2011, 6 pages, U.S. Appl. No. 12/476,438, filed Jun. 2, 2009.
Notice of Allowance dated Mar. 29, 2012, 7 pages, U.S. Appl. No. 12/476,438, filed Jun. 2, 2009.

* cited by examiner

*Primary Examiner* — Edward Johnson
(74) *Attorney, Agent, or Firm* — Conley Rose, P.C.; Grant Rodolph

(57) ABSTRACT

A production saltwater evaporation apparatus, comprising a separation and storage area comprising an iodine separation unit configured to remove iodine from production saltwater and produce saltwater, and an evaporator configured to emit a stream of the saltwater along a path in air such that at least some of the water in the saltwater evaporates. Included is a production saltwater evaporation apparatus, comprising a saltwater clarifying unit configured to separate metals from production saltwater and produce saltwater, and an evaporator configured to emit a stream of the saltwater along a path in air such that at least some of the water in the saltwater evaporates.

18 Claims, 16 Drawing Sheets

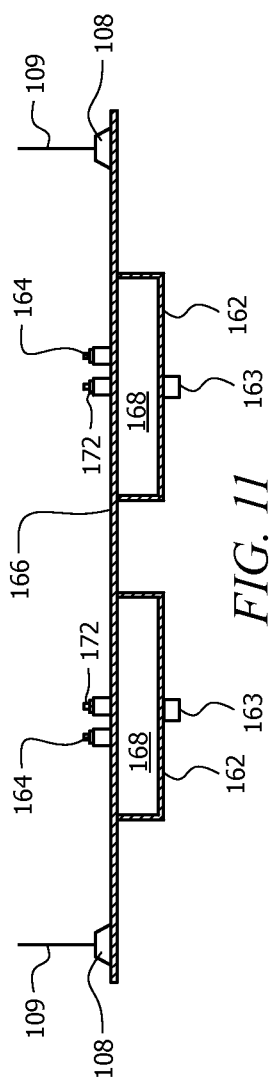
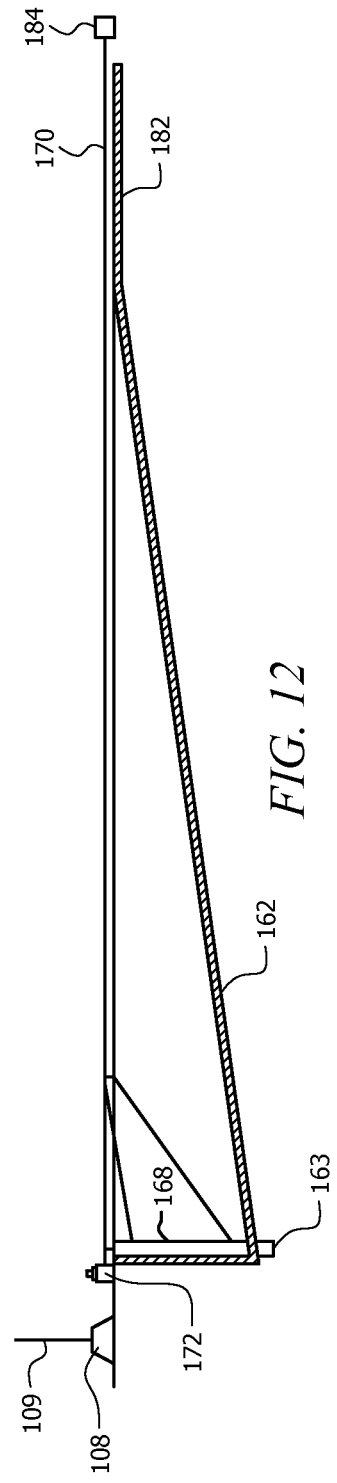

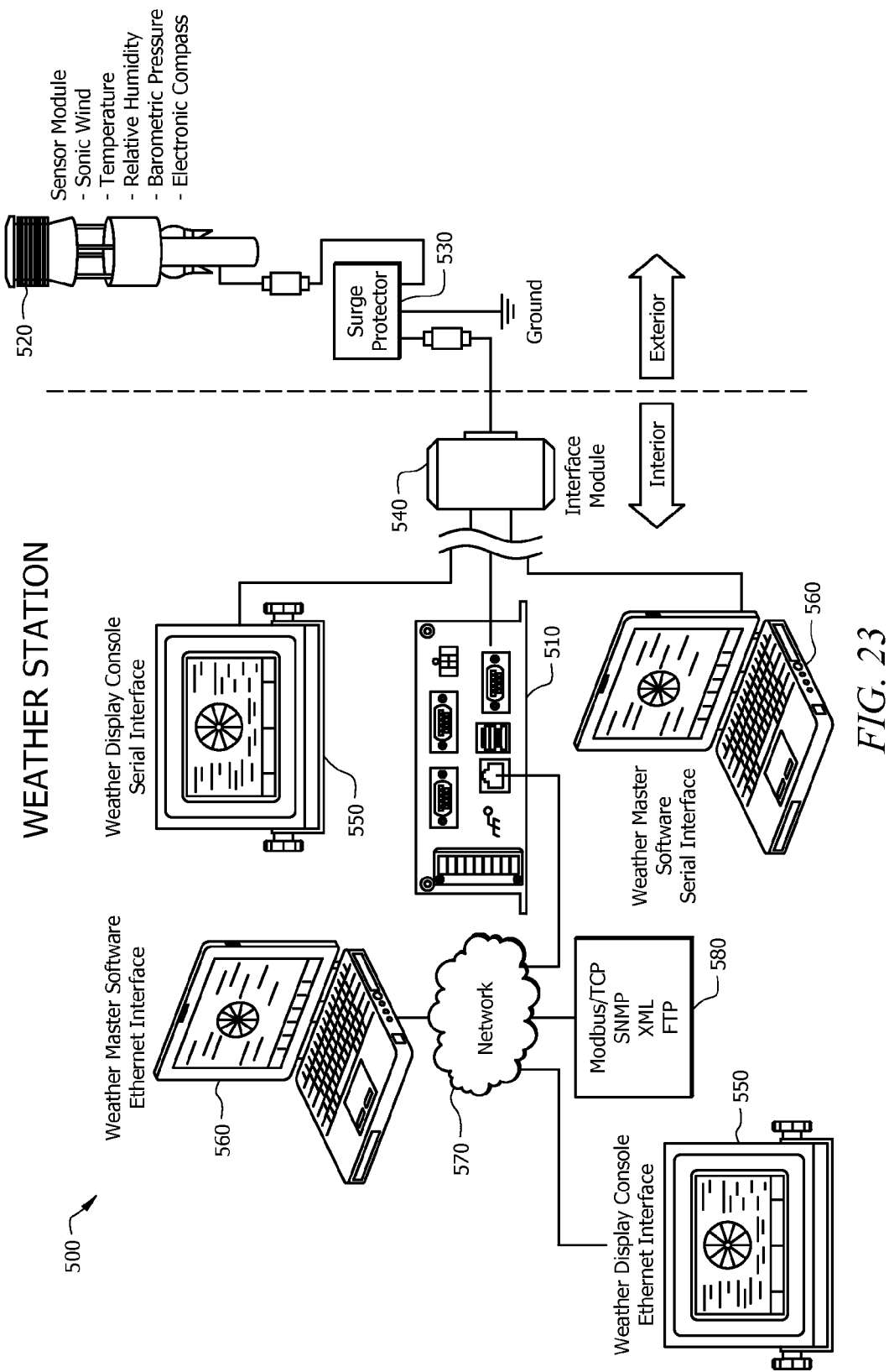

SUBTERRANEAN WELL PRODUCTION SALTWATER EVAPORATION STATION WITH IODINE SEPARATOR

CROSS-REFERENCE TO RELATED APPLICATIONS

The present application is a continuation-in-part of U.S. patent application Ser. No. 14/188,283, filed Feb. 24, 2014, which is a continuation-in-part of U.S. patent application Ser. No. 13/532,500, filed Jun. 25, 2012 by Dennis Hudgens and entitled "Subterranean Well Production Saltwater Evaporation Station," now U.S. Pat. No. 8,703,065, which is a continuation-in-part of U.S. patent application Ser. No. 12/476,438, filed Jun. 2, 2009 by Dennis Hudgens and entitled "Subterranean Well Production Saltwater Evaporation Station," now U.S. Pat. No. 8,226,735, all of which are incorporated herein by reference as if reproduced in their entireties.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Water occurs naturally in subterranean formations, and as such may be produced in conjunction with hydrocarbons from oil and gas wells. Water also may be used to stimulate hydrocarbon production in oil and gas wells. When the water is produced from oil or gas wells, it typically comprises sufficient amounts of dissolved salts to make it unsuitable for agriculture and other purposes. The produced saltwater may also comprise several harmful compounds, such as benzene, toluene, ethylbenzene, xylene, transition metals, or combinations thereof. As such, oil and gas well operators generally have to pay to dispose of any produced saltwater.

SUMMARY

In one embodiment, the disclosure includes a production saltwater evaporation apparatus, comprising a separation and storage area comprising an iodine separation unit configured to remove iodine from production saltwater and produce saltwater, and an evaporator configured to emit a stream of the saltwater along a path in air such that at least some of the water in the saltwater evaporates.

In another embodiment, the disclosure includes a production saltwater evaporation apparatus, comprising a saltwater clarifying unit configured to separate metals from production saltwater and produce saltwater, and an evaporator configured to emit a stream of the saltwater along a path in air such that at least some of the water in the saltwater evaporates.

In yet another embodiment, the disclosure includes a production saltwater evaporation apparatus, comprising an iodine separation unit configured to remove iodine from the production saltwater and produce saltwater, and an evaporator configured to emit a stream of the saltwater along a path in air such that at least some of the water in the saltwater evaporates.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 11 is a section view of an embodiment of the evaporation area taken across line 11-11 in FIG. 10.

FIG. 12 is a section view of an embodiment of the evaporation area taken across line 12-12 in FIG. 10.

FIG. 23 is a schematic view of an embodiment of a weather-monitoring controller.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a method and apparatus for recovering salt from saltwater produced from subterranean wells, such as oil and gas wells. The production saltwater may be received in a reception area and subsequently stored in a storage area. The production saltwater may undergo an initial separation in the storage area to remove some of the hydrocarbons from the saltwater. The saltwater may then be passed to a separation area comprising one or more settling pits or tanks, an iodine separation unit, and/or a water clarifying unit that allow solids to settle out of the saltwater and remove any residual hydrocarbons from the saltwater. The saltwater may then be sent to an evaporation area where the saltwater is sprayed into the air. While in the air, substantially all of the water in the saltwater may evaporate and the salt may fall into a collection pit. The salt may be periodically moved from the collection pit to a storage area, where the salt may be kept until it is loaded into a storage container or vehicle.

Figure 1:
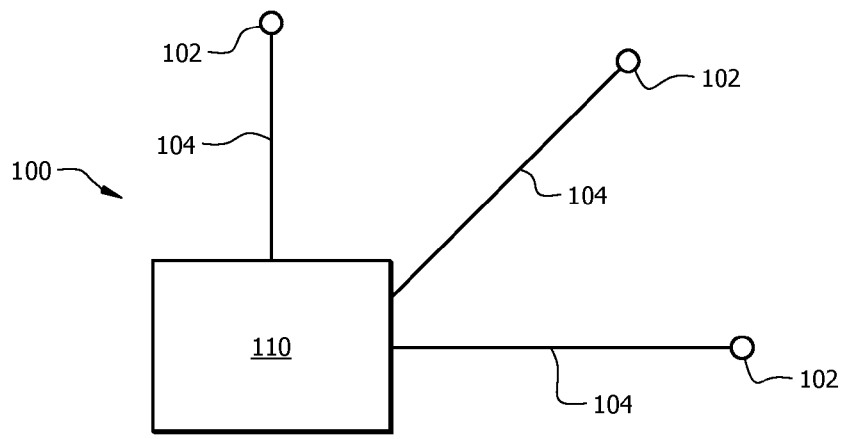
FIG. 1 is a schematic view of an embodiment of a subterranean well production field.

FIG. 1 depicts an embodiment of a subterranean well field 100. The subterranean well field 100 may comprise a plurality of wells 102 coupled to a salt production station 110 via a plurality of pipelines 104. The wells 102 may be hydrocarbon, e.g. oil and/or natural gas, wells that produce production saltwater as a byproduct. For example, each well 102 may produce at least about 1 barrel per day, from about 5 to about 50 barrels per day, or about 25 barrels per day of production saltwater. The production saltwater may comprise water and one or more salts, perhaps in combination with other compounds. The saltwater present in the effluent from the wells 102 may be the result of subterranean water deposits that are in fluid communication with the subterranean hydrocarbon deposits. Alternatively, the saltwater present in the effluent from the wells 102 may be the result of water and/or steam injection into the subterranean formation, for example to increase hydrocarbon production from the well 102. The wells 102 may comprise a separation system that separates the well effluent into a hydrocarbon-rich stream and a production saltwater-rich stream, which may be sent to the salt production station 110. In an embodiment, after the hydrocarbons are separated from the production saltwater, the saltwater may be transported to the salt production station 110 without further processing. In other embodiments, the wells 102 may be water wells or any other apparatus that produces saltwater.

The wells 102 may transport the production saltwater to the salt production station 110 via the pipelines 104. The pipelines 104 are similar to those well known in the art and may comprise metal or composite piping having a diameter appropriate for the production saltwater flow. The length of the pipeline 104 may vary depending on the distance between the wells 102 and the salt production station 110. For example, the pipelines 104 may be as short as a few yards or as long as several hundred miles. Typically, the pipelines 104 may have a length less than about 100 miles.

Figure 2:
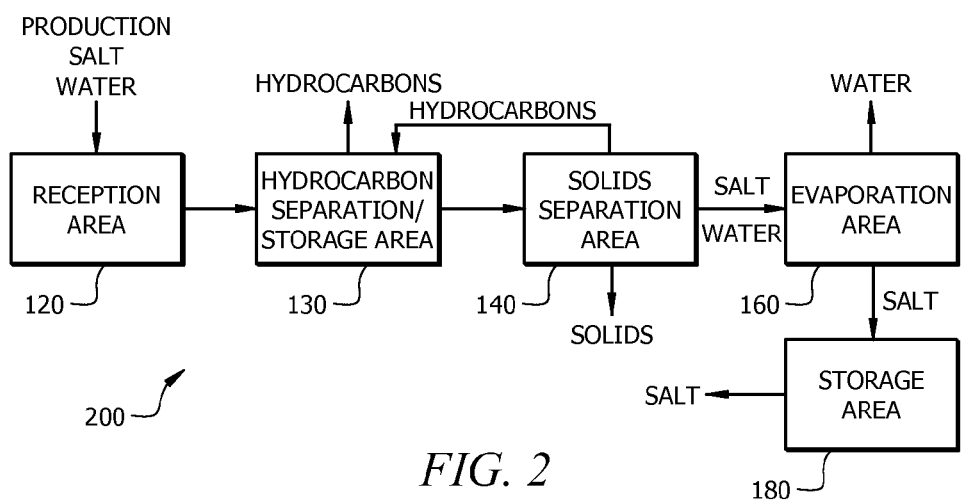
FIG. 2 is a flowchart of an embodiment of a production saltwater separation process.

The salt production station 110 may be any device or apparatus configured to produce salt from production saltwater. For example, the salt production station 110 may implement a production saltwater separation process, such as the production saltwater separation process 200 illustrated in FIG. 2. In the production saltwater separation process 200, a batch or continuous stream of production saltwater may be received in a reception area 120. A hydrocarbon separation/storage area 130 may store the production saltwater, and at least some of the hydrocarbons may be separated from the saltwater in a hydrocarbon separation/storage area 130. The hydrocarbon separation/storage area 130 may have storage facilities for the raw production saltwater (which generally will include hydrocarbons and/or solids), the cleaned saltwater (which may include some residual hydrocarbons and/or solids), and/or hydrocarbons that have been separated from at least some of the saltwater (in either the hydrocarbon separation/storage area 130 or the solids separation area 140). In some embodiments, at least some of the saltwater may be removed from the production saltwater separation process 200 and sold as fracturing (frac) water (e.g. water used in subterranean fracturing operations). The saltwater, which may include solids and/or residual hydrocarbons, may then pass to a solids separation area 140, in which substantially all of the remaining hydrocarbons and/or solids may be separated from the saltwater in a solids separation area 140. Any hydrocarbons separated in the solids separation area 140 may be returned to the hydrocarbon separation/storage area 130. The production saltwater separation process 200 may also separate the water from the salt in an evaporation area 160 and store the salt in a salt storage area 180. In an embodiment, the hydrocarbons, solids, and salt may be suitably disposed or preferably sold, while the water may be evaporated into the atmosphere.

The production saltwater may comprise water and at least one salt. As used herein, a salt may be any compound that comprises, consists essentially of, or consists of an ionic bond, such as the bond formed between an anion and a cation. The salts may include alkaline metals, alkaline earth metals, halides, transition metals, poor metals, non-metals, oxides, hydroxides, or combinations thereof. The salts with greater solubility in water may be included in the salt produced by the salt production station 110, while the salts with less solubility in water may be removed from the water in the solids separation area 140 along with any non-salt solids.

The saltwater may comprise a substantial amount of salts. For example, the saltwater may comprise at least about 5 grams per liter (g/L), from about 10 to about 100 g/L, or about 34 g/L dissolved salts. In an embodiment, the saltwater may comprise an alkaline metal, such as at least about 5,000 parts per million (ppm), from about 10,000 ppm to about 20,000 ppm, or about 15,000 ppm dissolved sodium. As such, the saltwater may have a sodium adsorption ratio (SAR) of at least about 50, from about 100 to about 400, or about 240. Additionally or alternatively, the saltwater may comprise an alkaline earth metal, such as at least about 25 ppm, from about 50 ppm to about 150 ppm, or about 74 ppm magnesium, at least about 50 ppm, from about 100 to about 300 ppm, or about 180 ppm calcium, and/or at least about 5 milligrams per liter (mg/L), from about 10 to about 100 mg/L, and/or about 52 mg/L barium. Additionally or alternatively, the saltwater may comprise at least 5 g/L, from about 10 g/L to about 100 g/L, or about 23 g/L of chloride. Additionally or alternatively, the saltwater may comprise a transition metal, such as at least about 0.1 micrograms per liter (µg/L), from about 0.5 to about 10 µg/L, or about 2 µg/L cadmium and/or at least about 0.1 µg/L, from about 0.5 to about 10 µg/L, or about 2 µg/L chromium. The saltwater may also comprise less than about 20 µg/L, less than about 10 µg/L, or less than about 5 µg/L silver and/or less than about 10 µg/L, less than about 5 µg/L, or less than about 0.8 µg/L mercury. Additionally or alternatively, the saltwater may comprise a poor metal, such as at least about 0.5 µg/L, from about 1 to about 20 µg/L, or about 8 µg/L lead. Additionally or alternatively, the saltwater may comprise a non-metal, such as at least about 10 ppm, from about 25 to about 100 ppm, or about 54 ppm sulfate, less than about 10 µg/L, less than about 5 µg/L, or less than about 1 µg/L arsenic, and/or less than about 100 µg/L, less than about 50 µg/L, or less than about 20 µg/L selenium.

In some embodiments, the production saltwater may include iodine, which may be present as an ionic salt with another element or in any other form. The amount of iodine in the production saltwater may vary by location, and in various embodiments may exist in the production saltwater in a concentration of at least about 50 parts per million (ppm), about 100 ppm-about 4,000 ppm, about 200 ppm-about 1,000 ppm, or about 300 ppm-about 700 ppm.

The production saltwater may also comprise various organic compounds. For example, the saltwater may comprise less than about 20 mg/L, less than about 10 mg/L, or less than about 5 mg/L of $C_6$-$C_{12}$ hydrocarbons, and less than about 20 mg/L, less than about 10 mg/L, or less than about 5 mg/L $C_{12+}$ hydrocarbons. The saltwater may also comprise benzene, toluene, ethylbenzene, xylene, or combinations thereof. For example, the saltwater may comprise at least about 0.02 mg/L, from about 0.04 to about 0.2 mg/L, or about 0.08 mg/L benzene and related compounds, at least about 0.02 mg/L, from about 0.04 to about 0.2 mg/L, or about 0.06 mg/L toluene and related compounds. In addition, at least about 0.001 mg/L, from about 0.005 to about 0.1 mg/L, or about 0.01 mg/L xylene and related compounds, and at least about 0.001 mg/L, from about 0.002 to about 0.05 mg/L, or less than about 0.005 mg/L ethylbenzene and related compounds. In a specific embodiment, the saltwater may comprise at least about 0.01 µg/L, from about 0.1 µg/L to about 5 µg/L, or about 0.6 µg/L of naphthalene, at least about 0.01 µg/L, from about 0.1 µg/L to about 5 µg/L, or about 0.3 µg/L 1-methylnaphthalene, at least about 0.01 µg/L, from about 0.1 µg/L to about 5 µg/L, or about 0.4 µg/L 2-methylnaphthalene, at least about 0.01 µg/L, from about 0.1 µg/L to about 1 µg/L, or about 0.2 µg/L penanthrene, at least about 0.01 µg/L, from about 0.1 µg/L to about 1 µg/L, or about 0.2 µg/L pyrene, and less than about 5 µg/L, less than about 1 µg/L, or less than about 0.2 µg/L each of acenaphthylene, acenaphthene, dibenzofuran, fluorene, anthracene, fluoranthene, benzo(a)anthracene, chrysene, benzo(b)fluoranthene, benzo(k)fluoranthene, benzo(a)pyrene, indeno(1,2,3-cd)pyrene, dibenzo(a,h)anthracene, benzo(g,h,i)perylene, or combinations thereof.

The hydrocarbons, solids, and salt produced by the production saltwater separation process 200 may each comprise substantially pure products. For example, the hydrocarbons produced by the production saltwater separation process 200 may comprise at least 80 weight percent, at least 95 weight percent, or at least 99 weight percent organic compounds, such as hydrocarbons. Similarly, the solids produced by the production saltwater separation process 200 may comprise at least 80 weight percent, at least 95 weight percent, or at least 99 weight percent non-dissolvable solids, such as metals. Finally, the salt produced by the production saltwater separation process 200 may comprise at least 80 weight percent, at least 95 weight percent, or at least 99 weight percent salts, such as alkali metals, alkaline earth metals, and halides.

The hydrocarbons, solids, and salt produced by the production saltwater separation process 200 may also each comprise substantial amounts of their respective components from the production saltwater received in the reception area 120. For example, the hydrocarbons produced by the production saltwater separation process 200 may comprise at least 80 weight percent, at least 95 weight percent, or at least 99 weight percent of the organic compounds present in the production saltwater. Similarly, the solids produced by the production saltwater separation process 200 may comprise at least 80 weight percent, at least 95 weight percent, or at least 99 weight percent of the solids present in the production saltwater. Finally, the salt produced by the production saltwater separation process 200 may comprise at least 80 weight percent, at least 95 weight percent, or at least 99 weight percent of the salts present in the production saltwater.

Figure 3:
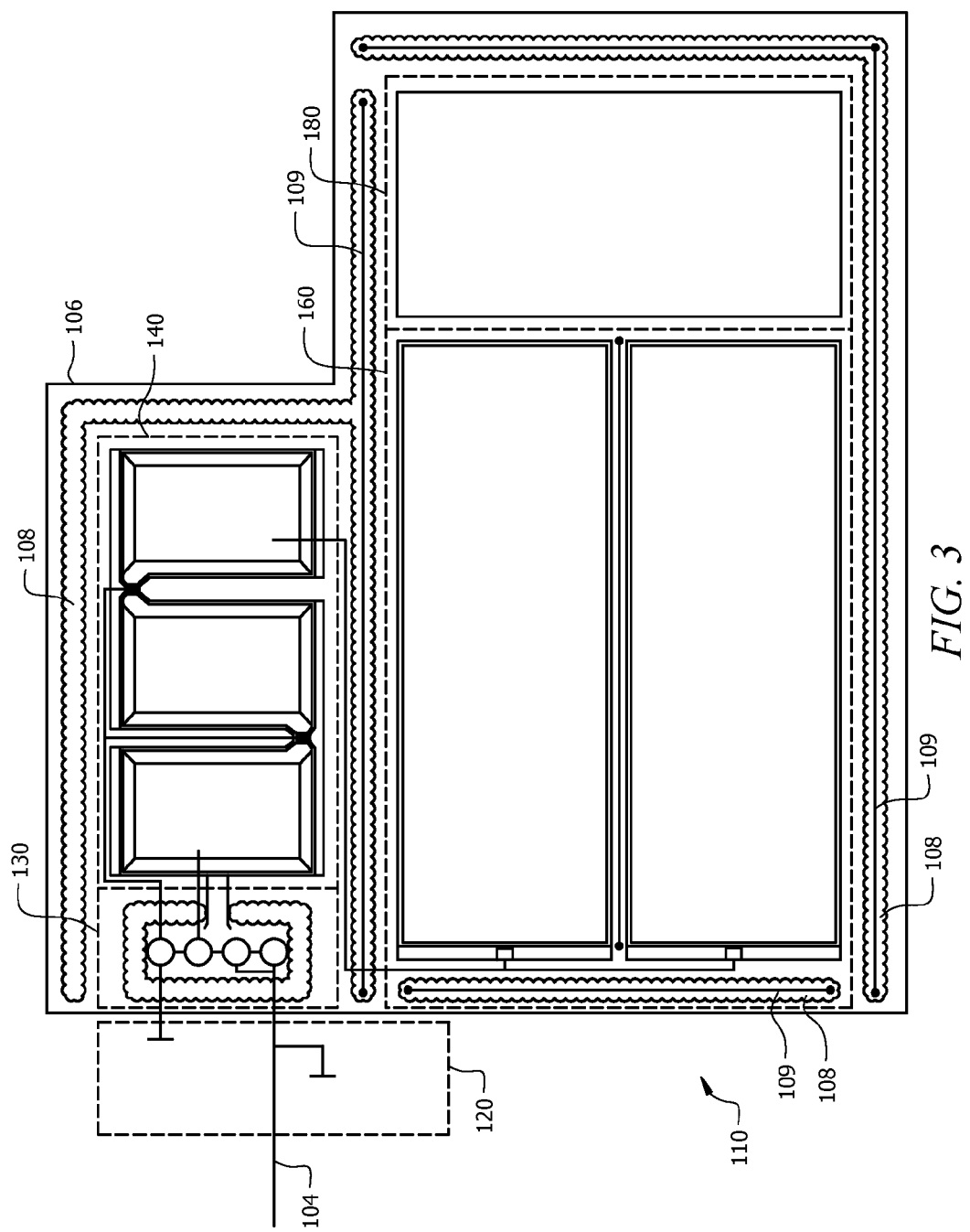
FIG. 3 is a plan view of an embodiment of a salt production station.

FIG. 3 depicts an embodiment of the salt production station 110. As shown in FIG. 3, the salt production station 110 comprises the reception area 120, the hydrocarbon separation/storage area 130, the solids separation area 140, the evaporation area 160, and the salt storage area 180. The reception area 120 may receive the production saltwater from the pipeline 104 or other sources, and may pass the production saltwater to the hydrocarbon separation/storage area 130 for storage. The hydrocarbon separation/storage area 130 may store the production saltwater, may separate at least some of the hydrocarbons from the saltwater, and may subsequently pass the production saltwater to the solids separation area 140 where any remaining hydrocarbons and solids are removed from the saltwater. The hydrocarbons may be returned to the hydrocarbon separation/storage area 130, while the solids may accumulate in and may be periodically removed from the solids separation area 140. The saltwater may then be transferred to the evaporation area 160 where the water may be separated from the salt, for example by evaporation. The salt may then be moved to the salt storage area 180 where it is stored for later transportation and/or sale. The salt production station 110 may be surrounded as appropriate by security fence 106, berms 108, and wind-deflecting fence 109 to provide site security, privacy, fluid containment in case of leaks, and/or wind protection. In addition, the salt production station 110 may comprise piping, valves, pumps, filters, controls, lighting, and safety equipment as is necessary to carry out the processes described herein.

Figure 4:
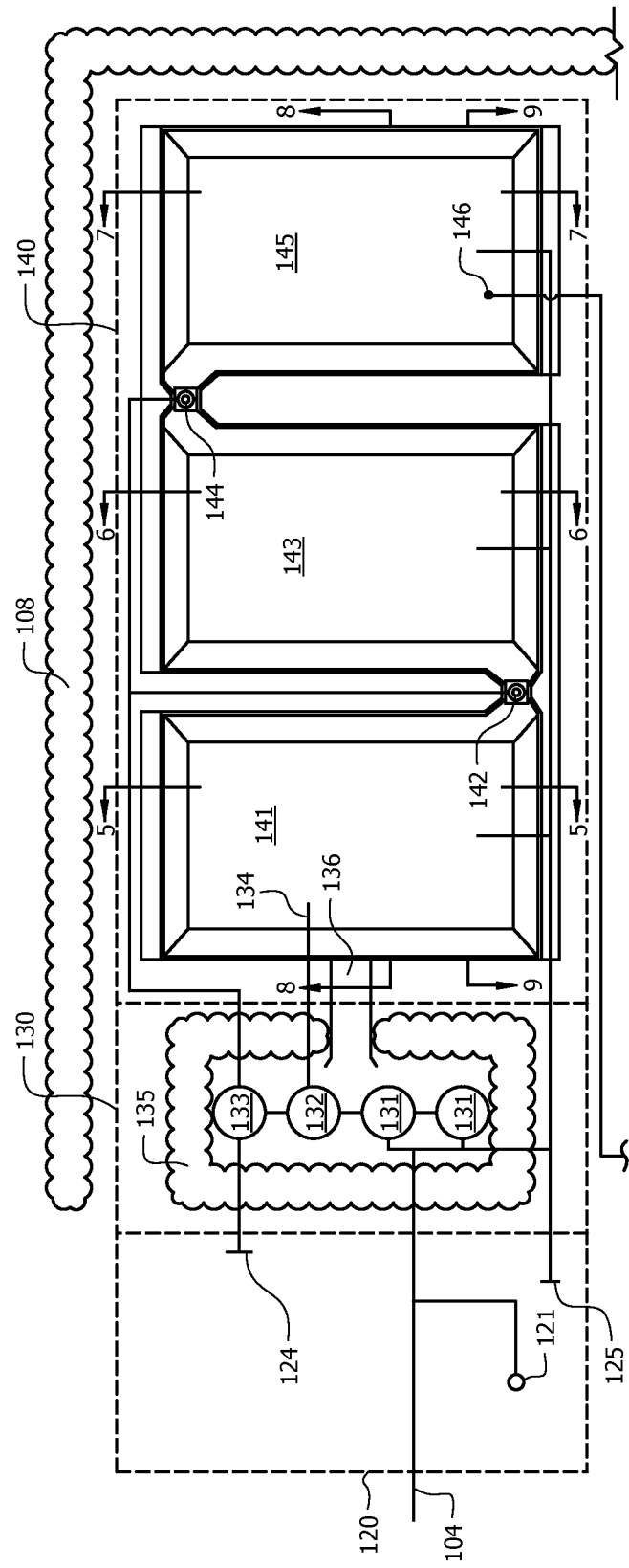
FIG. 4 is a plan view of embodiments of a reception area, a storage area, and a separation area.
Figure 5:
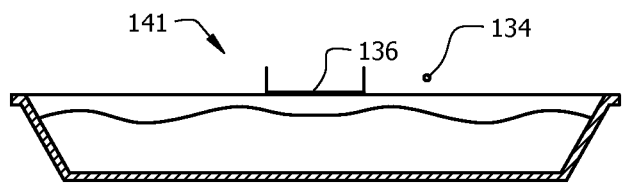
FIG. 5 is a section view of an embodiment of the separation area taken across line 5-5 in FIG. 4.
Figure 6:
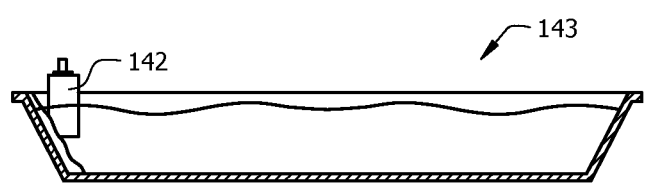
FIG. 6 is a section view of an embodiment of the separation area taken across line 6-6 in FIG. 4.
Figure 7:
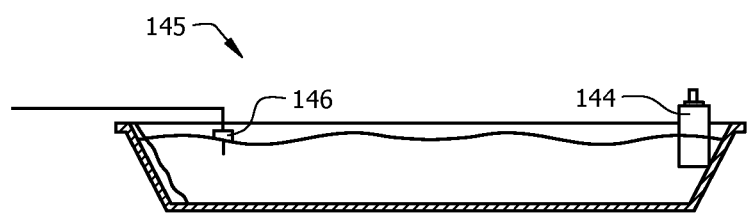
FIG. 7 is a section view of an embodiment of the separation area taken across line 7-7 in FIG. 4.
Figure 8:
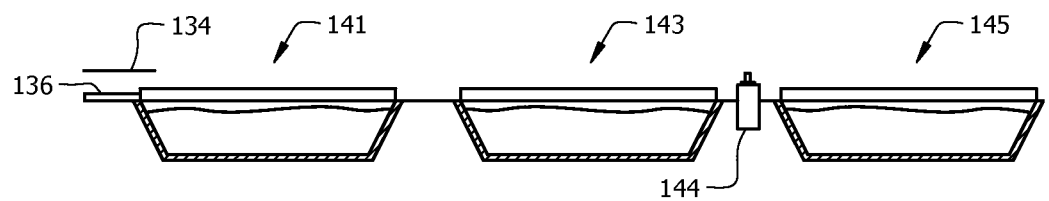
FIG. 8 is a section view of an embodiment of the separation area taken across line 8-8 in FIG. 4.
Figure 9:
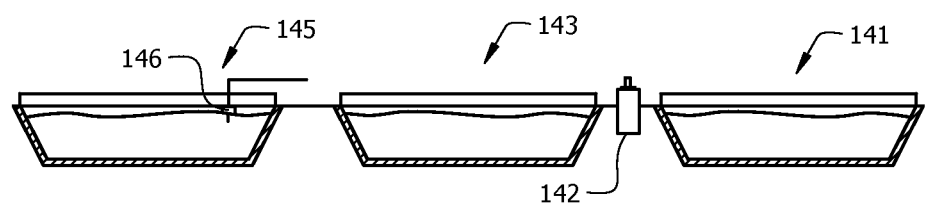
FIG. 9 is a section view of an embodiment of the separation area taken across line 9-9 in FIG. 4.

FIG. 4 depicts a more detailed embodiment of the reception area 120. The reception area 120 may be configured to intake production saltwater from the pipeline 104 or at least one intake connection 121, which may be configured to connect to a vehicle such as a truck, train, ship, or combinations thereof. While the pipeline 104 and the intake connection 121 may pipe the production saltwater directly to the hydrocarbon separation/storage area 130, more typically the production saltwater may pass through metering equipment configured to measure the volume and amount of production saltwater received by the reception area 120. In addition, the reception area 120 may comprise composition evaluation equipment that can evaluate the composition of the production saltwater, and/or authorization equipment that can determine whether the vehicle is authorized to transfer the production saltwater to the salt production station 110. Furthermore, the reception area 120 may be configured to transfer hydrocarbons, saltwater, solids, or combinations thereof from the salt production station 110. For example, the reception area 120 may comprise a hydrocarbon effluent connection 124 that may be configured to transfer the hydrocarbons from the hydrocarbon separation/storage area 130 to one of the aforementioned vehicles. Alternatively or additionally, the reception area 120 may comprise a vacuum discharge connection 125 that may be configured to transfer the solids and/or saltwater from the solids separation area 140 and/or the production saltwater storage tanks 131 to one of the aforementioned vehicles. Moreover, the reception area 120 may comprise accounting equipment configured to make or receive payment associated with the transfer of production saltwater, hydrocarbons, and/or solids into or out of the salt production station 110. The reception area 120 may also be configured with drip pot connections, strainers, electronic butterfly valves, check valves, totalizers, and card readers as appropriate. There may be several components of the reception area 120 that may need to be accessible by persons who do not necessarily need to access the remainder of the salt production station 110. As such, some components of the reception area 120, e.g. connections and authorization equipment, may be on the outside of the security fence 106, while other components of the reception area 120, e.g. sampling equipment, metering equipment, pumps, valves, etc., may be on the inside of the security fence 106.

FIG. 4 also depicts a more detailed embodiment of the hydrocarbon separation/storage area 130. The hydrocarbon separation/storage area 130 may comprise a plurality of production saltwater storage tanks 131 that may receive production saltwater from the reception area 120 and store the production saltwater until it is transferred to the solids separation area 140. The production saltwater storage tanks 131 may be configured such that either or both production saltwater storage tanks 131 may be used to store the production saltwater. Such a configuration allows one of the production saltwater tanks 131 to be down for maintenance while the other is operating. The production saltwater storage tanks 131 also may allow the salt production station 110 to operate at a discontinuous or substantially continuous rate, e.g. independent of the intake rate of production saltwater at the reception area 120. In other words, the hydrocarbon separation/storage area 130 may allow the salt production station 110 to operate only when economically favorable conditions exist.

When the production saltwater leaves the production saltwater storage tanks 131, it may pass through a gun barrel separator 132. The gun barrel separator 132 may allow the production saltwater to remain relatively still, thereby allowing at least some of the hydrocarbons to form an organic phase that is predominately hydrocarbons and other compounds having an affinity for the organic phase on top of the aqueous phase that is predominantly water and other compounds having an affinity for the aqueous phase. The gun barrel separator 132 may also comprise monitoring equipment that maintains the organic-aqueous phase boundary at a substantially constant level or within a predetermined range, and a siphon or a weir skimmer or pipe to remove the organic phase. The organic phase may be transferred to a hydrocarbon storage tank 133, while the aqueous phase saltwater may be removed from a point below the organic-aqueous phase boundary and away from the inlet, and may be transferred to the solids separation area 140 or stored/sold as frac water. The hydrocarbon storage tank 133 may also receive hydrocarbons from the solids separation area 140 and may store the hydrocarbons until they are ready to be transferred to a vehicle via the hydrocarbon effluent connection 124. The hydrocarbon effluent connection 124 may be configured with drip pot connections, strainers, electronic butterfly valves, ball valves, check valves, totalizers, and card readers as appropriate.

The production saltwater storage tanks 131, gun barrel separator 132, and hydrocarbon storage tank 133 may be constructed of materials and sized appropriately for the composition and amount of production saltwater flowing through the salt production station 110. For example, the production saltwater storage tanks 131, gun barrel separator 132, and hydrocarbon storage tank 133 may be made of fiberglass, steel, or any other suitable material and may have a volume of at least about 100 barrels, from about 200 barrels to about 1,000 barrels, or about 500 barrels. In addition, the production saltwater storage tanks 131, gun barrel separator 132, and hydrocarbon storage tank 133 may be surrounded by a berm 135 and a trough 136 that are lined with a liner, such as a polymer liner about 0.06 inches thick, and downwardly graded towards the solids separation area 140. As such, any rupture or leakage from the production saltwater storage tanks 131, gun barrel separator 132, and/or hydrocarbon storage tank 133 may be routed into the solids separation area 140.

FIGS. 4-9 depict a more detailed embodiment of the solids separation area 140. The solids separation area 140 may comprise a first settling pit 141, a second settling pit 143, and a third settling pit 145 (collectively, the settling pits). The saltwater generally flows from the first settling pit 141 to the second settling pit 143 to the third settling pit 145, and as it does so solids and hydrocarbons are removed from the saltwater. Specifically, the first settling pit 141 may receive the saltwater from the gun barrel separator 132 via a discharge pipe 134. The trough 136 may also be configured to discharge into the first settling pit 141. Solids settle to the bottom of the first settling pit 141, and if desired, various compounds can be added to first settling pit 141 to promote the settling and/or precipitation of the solids, e.g. by reacting with the solids, changing the temperature of the saltwater, changing the pH of the saltwater, or combinations thereof. The saltwater and any hydrocarbons subsequently pass through a first weir skimmer 142 positioned between the first settling pit 141 and the second settling pit 143. The first weir skimmer 142 skims any hydrocarbons off the saltwater, while the saltwater passes through to the second settling pit 143. Piping connected to the first weir skimmer 142 transports any collected hydrocarbons back to the hydrocarbon storage tank 133. Similarly, solids settle to the bottom of the second settling pit 143, and the saltwater and any remaining hydrocarbons pass through a second weir skimmer 144 positioned between the second settling pit 143 and the third settling pit 145. The second weir skimmer 144 skims any hydrocarbons off the saltwater, while the saltwater passes through to the third settling pit 145. Piping connected to the second weir skimmer 144 transports the hydrocarbons back to the hydrocarbon storage tank 133. In a specific embodiment, the first weir skimmer 142 and the second weir skimmer 144 are both stainless steel DRAGONFLY MICRO OIL SKIMMERS. Like the first settling pit 141 and the second settling pit 143, solids settle out of the saltwater in the third settling pit 145, and the saltwater, which is substantially free of solids and hydrocarbons, is removed from the third settling pit 145 via a discharge pipe 146. The discharge pipe 146 may be a flexible pipe configured to remove saltwater from the top of the third settling pit 145, e.g. such that it does not suck up substantially any solids.

The settling pits may be sized as appropriate for the flow of production saltwater through the salt production station 110. For example, each of the settling pits may have a volume of at least about 5,000 barrels, from about 10,000 barrels to about 100,000 barrels, or about 25,000 barrels. In addition, one or more of the settling pits may be sloped to promote migration of the solids towards a certain direction, and the slope of each settling pit may be the same or different. For example, the settling pits may have a slope of from about 0.1 percent to about 60 percent, from about 0.5 percent to about 10 percent, or about 1 percent. The slope direction may be to one side of the settling pits, e.g. up, down, left, or right in FIG. 4, may be towards the center of the settling pit, may be towards the perimeter of the settling pit, or combinations thereof. In a specific embodiment, the settling pits have a 1 percent slope in the downward direction in FIG. 4, and have a 1 percent slope from the left and right sides in FIG. 4 towards the center of the settling pits. In an embodiment, the settling pits may comprise a primary liner such as a polymer liner having a thickness of at least about 0.01 inches, from about 0.02 inches to about 0.1 inches, or about 0.06 inches. In addition, the settling pits may comprise a leakage detection system. For example, a secondary liner, such as a polymer liner having a thickness of at least about 0.005 inches, from about 0.01 inches to about 0.1 inches, or about 0.02 inches, may be laid under the primary liner, and a drainage material, e.g. gravel or synthetic material, may be positioned therebetween. In addition, a leakage detection pipe may extend from the surface into the drainage material so that an operator may visually inspect the drainage material to determine whether the primary liner is leaking. Alternatively, an automatic leakage detection system may be positioned within the leakage detection pipe. It will be appreciated that above ground tanks or any other storage medium could be used instead of the pits described herein. The tanks or other storage medium can be used for merely storage of the saltwater, as settling tanks (similar to the settling pits described above), or combinations thereof. Also, the settling pits may also be covered with netting to prevent operators or wildlife from falling into the settling pits.

Figure 10:
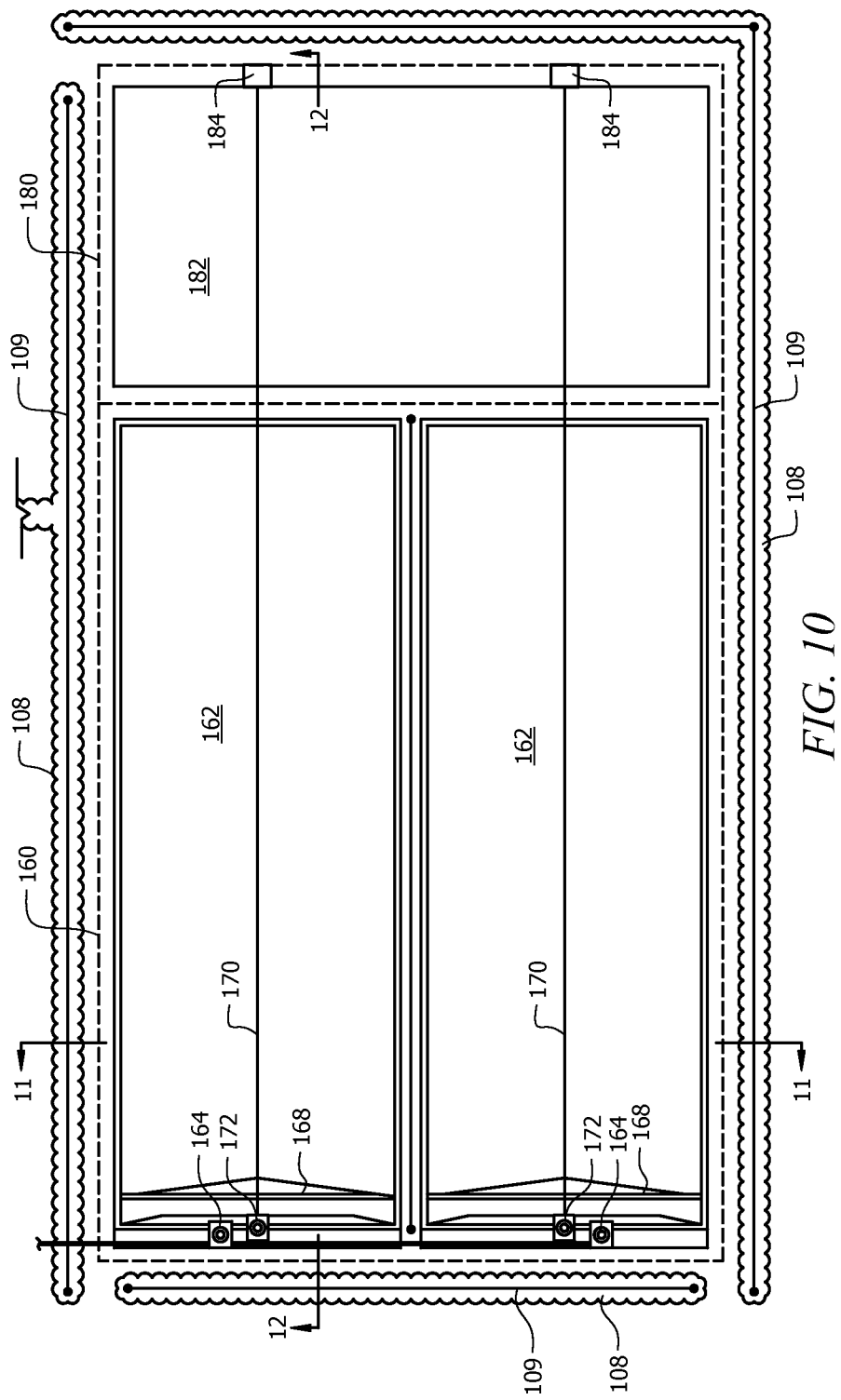
FIG. 10 is a plan view of embodiments of an evaporation area and the storage area.

FIGS. 10-12 depict a more detailed embodiment of the evaporation area 160. The evaporation area 160 may comprise a plurality of substantially identical evaporation stations. The evaporation stations may be configured such that either or both evaporation station may be used to evaporate the saltwater. Such a configuration allows one of the evaporation stations to be down for maintenance while the other is operating. Each evaporation station may comprise an evaporator 164 and a collection pit 162. The evaporator 164 may be any device configured to separate the water from the salt in the saltwater. For example, the evaporator 164 may be a TURBO-MIST evaporator manufactured by SLIMLINE manufacturing. The evaporator 164 may comprise an upward-directed nozzle that is configured to spray the saltwater received from the solids separation area 140 into the air. The nozzle may be configured to produce at least one fine stream that allows at least some of the water to evaporate while in the air, which leaves the salt to fall into the collection pit 162. For example, the evaporator 164 may be configured to spray at least about 10 barrels per hour, from about 20 barrels per hour to about 500 barrels per hour, or about 50 barrels per hour of saltwater. As such, the salt production station 110 may produce at least 1,000 pounds per day, from about 2 tons per day to about 50 tons per day, or about 10 tons per day of salt. In an embodiment, the horizontal and/or vertical orientation of the nozzle may be adjustable and perhaps controlled automatically to account for wind, temperature, relative humidity, and so forth. The collection pit 162 may be oriented such that the prevailing winds blow across or behind the evaporator 164 effluent. The collection pit 162 may be sized to collect substantially all of the salt produced by the evaporation. For example, the collection pit 162 may be from about 50 feet to about 200 feet, from about 70 feet to about 125 feet, about 90 feet wide, from about 50 feet to about 600 feet, from about 150 feet to about 500 feet, about 350 feet long, and from about 1 foot to about 20 feet, from about 2 feet to about 10 feet, about 5 feet deep. The collection pit 162 may also be configured with a drain 163 as well as pumps and piping appropriate to recover any unevaporated water and return such to the evaporators 164, solids separation area 140, and/or hydrocarbon separation/storage area 130.

In addition, one or more of the collection pits 162 may be sloped to promote migration of the salt and/or any residual water towards a certain direction, and the slope of each collection pit 162 may be the same or different. For example, the collection pit 162 may have a slope of from about 0.1 percent to about 60 percent, from about 0.5 percent to about 10 percent, or about 1 percent. The slope direction may be to one side of the collection pit 162, e.g. up, down, left, or right in FIG. 10, may be towards the center of the collection pit 162, may be towards the perimeter of the collection pit 162, or combinations thereof. In a specific embodiment, the collection pit 162 may have a 1 percent slope from right to left in FIG. 10, e.g. towards to the evaporator 164, and may have a 1 percent slope from the top and bottom sides in FIG. 10, e.g. towards the center of the collection pit 162. Furthermore, the collection pit 162 may comprise a liner similar to the primary or secondary liner described above. Finally, the evaporation area 160 may be surrounded by the berm 108 and/or wind-deflecting fence 109, e.g. an 8-foot high berm and/or a 15-foot high wind-deflecting fence, to prevent the wind from blowing the water stream and/or salt away from the collection pit 162. The berm 108 and/or wind-deflection fence 109 may be installed between individual evaporations stations, if desired.

Each evaporation station may comprise a salt conveyor that is configured to move the salt from the collection pit 162 to the salt storage area 180. For example, the evaporation station may comprise a blade 168, a motor 172, and a cable 170. The blade 168 may be a box blade or any other apparatus configured to scrape the salt across the collection pit 162. If desired, the blade 168 may have a horizontal and/or vertical concavity to promote collection and movement of the salt. The blade 168 may be connected to the motor 172 by the cable 170, which may extend from the motor 172 through a pulley 184 in the salt storage area 180 and to the blade 168 from one side of the motor 172, and directly to the blade 168 on the other side of the motor 172. As such, when the motor 172 is actuated in a forward direction, the blade 168 may be pulled across the collection pit 162 in a first direction, e.g. towards the pulley 184, and may move the salt from the collection pit 162 to the salt storage area 180. Similarly, when the motor 172 is actuated in a reverse direction, the blade 168 may be pulled across the collection pit 162 in a second direction, e.g. towards the motor 172, and may return to its initial location proximate to the evaporators 164. If desired, the blade 168 may also be fitted with a vertical actuation mechanism that raises and lowers the blade 168. The blade 168 may be actuated as needed to prevent excessive build-up of salt in the collection pit 162. In addition, the blade 168 may be actuated when the evaporators 164 are not in operation, e.g. to limit the amount of salt build-up behind the blade 168. Additionally or alternatively, the evaporation station may use backhoes, bulldozers, front-end loaders, or other mobile equipment to move the salt from the collection pit 162 to the salt storage area 180.

FIGS. 10 and 12 also depict a more detailed embodiment of the salt storage area 180. The salt storage area 180 may comprise a salt storage pad 182 and the pulley 184. The salt storage pad 182 may be used as a storage area and/or additional drying area for the salt until the salt can be loaded into a storage container or vehicle. If desired, a roof or tarp may be used to cover the salt, e.g. to prevent rain from wetting or wind from blowing away the salt. Additionally or alternatively, the salt storage pad 182 may be surrounded by the aforementioned berm 108 and/or wind-deflecting fence 109. The salt may meet or exceed various federal and/or state regulations for agricultural and livestock use, and as such the salt may be suitable for agricultural use and/or animal consumption.

The efficiency with which the salt production station 110 produces the salt may be dependent on the environmental conditions at the salt production station 110. In an embodiment, the salt production station 110 may be operated when the ambient temperature is at least about 50° F., at least about 70° F., or at least about 90° F. In addition, the salt production station 110 may be operated when the relative humidity is no more than about 60 percent, no more than about 30 percent, or no more than about 10 percent. Such conditions, along with the wind, may cause at least about 40 weight percent, at least about 60 weight percent, or at least about 90 weight percent of the water in the saltwater to evaporate.

Figure 13:
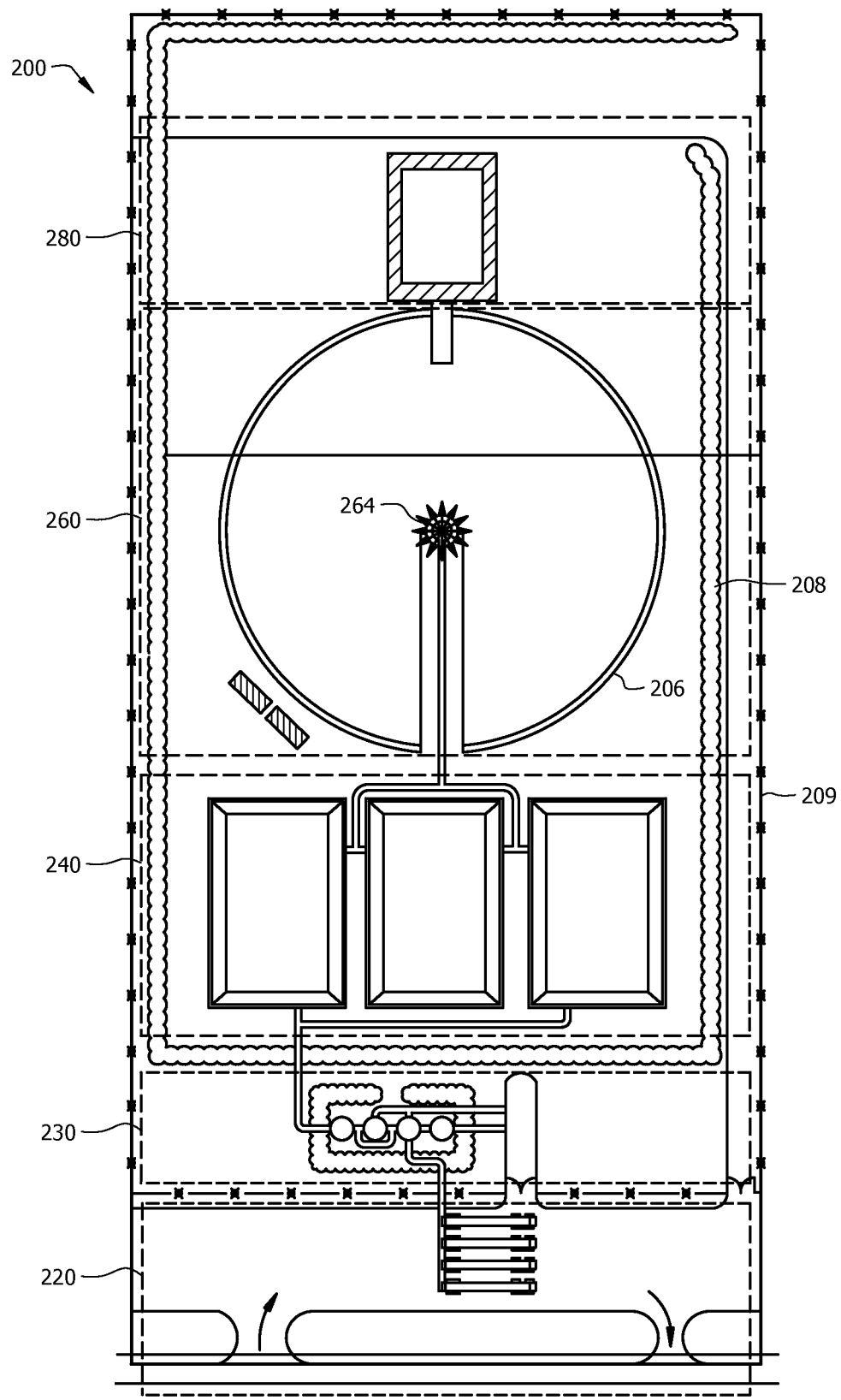
FIG. 13 is a plan view of another embodiment of the salt production station.

FIG. 13 depicts another embodiment of the production saltwater separation process 200. The production saltwater separation process 200 functions substantially similar to salt production station 110, but the production saltwater separation process 200 may be arranged in a different configuration. As with the salt production station 110, the production saltwater separation process 200 may comprise a reception area 220, a production saltwater storage area 230, a separation area 240, an evaporation area 260, and a salt storage area 280 arranged as shown in FIG. 13. Production saltwater may be received from trucks or via pipeline at the reception area 220 and stored in the production saltwater storage area 230 for storage and removal of the hydrocarbons. The production saltwater may then flow into the separation area 240 where metals and components other than salt and water are removed. The remaining saltwater may then flow into the evaporation area 260 where the water is separated from the salt via evaporation. The salt is recovered from the ground in the evaporation area 260, and then stored in the salt storage area 280. Unlike the salt production station 110, production saltwater separation process 200 is configured to recover the evaporated water using condensers, thus yielding fresh water. The production saltwater separation process 200 may be surrounded as appropriate by security fence 206, berms 208, and wind-deflecting fence 209 to provide site security, privacy, fluid containment in case of leaks, and/or wind protection. In a specific embodiment, the security fence 206 may be a six feet tall chain link fence topped with three strands of barbed wire. In addition, the production saltwater separation process 200 may comprise piping, valves, pumps, filters, controls, lighting, and safety equipment as is necessary to carry out the processes described herein. In a specific embodiment, the production saltwater separation process 200 may comprise pipes with diameters of about three inches, four inches, eight inches, or combinations thereof.

Figure 14:
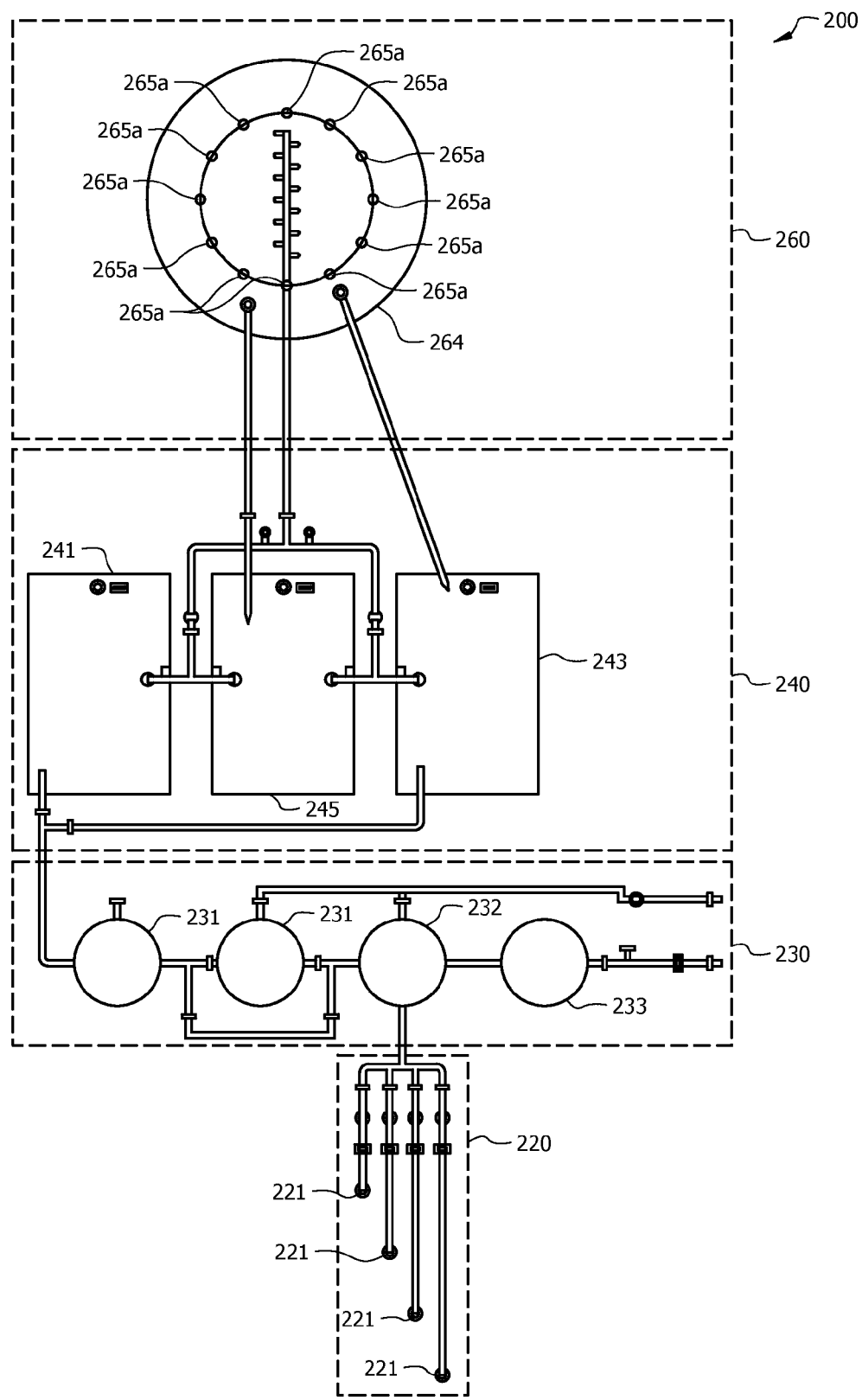
FIG. 14 is a schematic view of the other embodiment of the salt production station.

FIG. 14 depicts a more detailed embodiment of the reception area 220. The reception area 220 may be configured to intake production saltwater from pipeline or trucks via intake connections 221, four of which are shown in FIG. 14. The intake connections 221 are substantially similar to the intake connections 121. The reception area 220 may be configured such that trucks, ships, or other vehicles enter and exit the reception area 220 going a single direction, e.g. the vehicles do not have to backup or otherwise reverse course when entering and leaving the reception area 220. The reception area 220 also may be configured such that a plurality of trucks, ships, or other vehicles can be positioned side-by-side while unloading the production saltwater.

FIG. 14 also depicts a more detailed embodiment of the production saltwater storage area 230. The production saltwater storage area 230 may comprise production saltwater storage tanks 231, a gun barrel separator 232, and a hydrocarbon storage tank 233 configured as shown in FIG. 14. The production saltwater storage tanks 231, gun barrel separator 232, and hydrocarbon storage tank 233 may be substantially similar as the saltwater storage tanks 131, gun barrel separator 132, and hydrocarbon storage tank 133 described above, except that the production saltwater may flow directly from the reception area 220 to the gun barrel separator 232. Hydrocarbons may be separated from the saltwater and may flow into the hydrocarbon storage tank 233, which is conveniently located next to a truck access station. The saltwater may flow from the gun barrel separator 232 to one or both of the saltwater storage tanks 231 for temporary storage or directly to the separation area 240. This configuration may ensure that a substantial amount of saltwater mixture is always available for use in the rest of the production saltwater separation process 200.

FIG. 14 also depicts a more detailed embodiment of the separation area 240. The production saltwater separation process 200 may comprise a first settling pit 241, a second settling pit 243, and a third settling pit 245, which may be substantially similar as the first settling pit 141, the second settling pit 143, and the third settling pit 145, respectively, but arranged as shown in FIG. 14. Specifically, the saltwater may flow from the production saltwater storage area 230 to the first settling pit 241 and the second settling pit 243 for separation of metals from the saltwater. The saltwater may then flow to the third settling pit 245 for additional metal separation prior to flowing into the evaporation area 260. This configuration may allow that the saltwater mixture to remain on the settling pits 241 and 243 for a prolonged period for greater separation. In a specific embodiment, the settling pits 241, 243, and 245 may each be about 160 feet long, about 100 feet wide, about seventeen inches deep at the deepest point and about fifteen inches deep at the most shallow point. Each pit may be separated by concrete pipe and a slide gate. Each pit may also be enclosed by a fence to prevent operators and wildlife from falling in. The fence perimeter may be about 166 feet by about 106 feet. The settling pits 241, 243, and 245 may also comprise ultrasonic sensors and hi/lo level controls which may be electrically connected to the weather monitoring controller 500 as discussed below. The berm 208 around the settling pits may be about fifty feet wide, about 96 feet long, and about 11.5 inches tall. In an alternate embodiment, settling pits 241, 243, and 245 may be replaced with aboveground and/or below ground storage tanks in substantially the same shape, position, and configuration as settling pits 241, 243, and 245. Such storage tanks may perform substantially the same function as settling pits 241, 243, and 245 and are included within the scope of the present disclosure.

Figure 15:
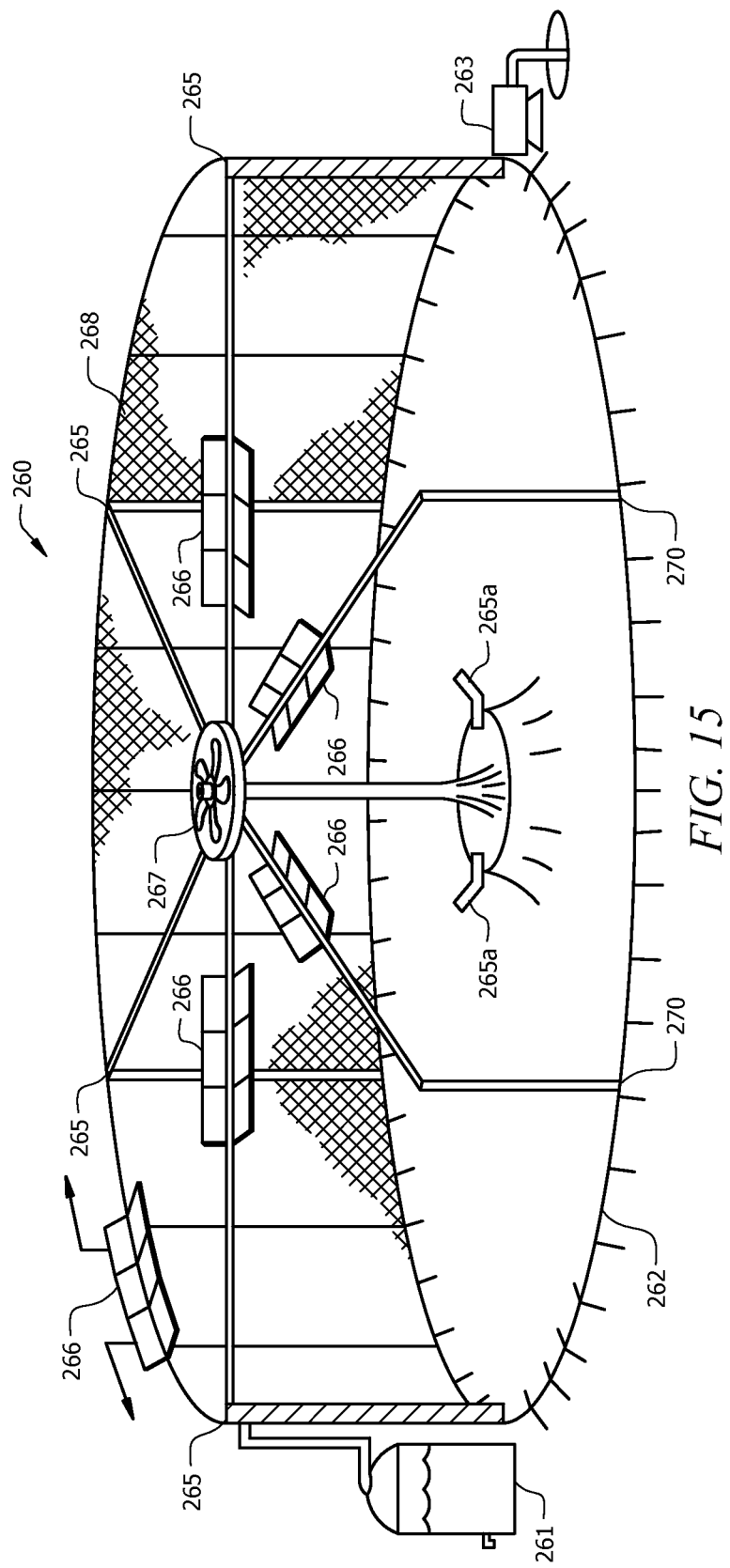
FIG. 15 is a perspective view of an embodiment of the evaporation area of FIGS. 13 and 14.

FIGS. 13-15 depict a more detailed embodiment of the evaporation area 260. The evaporation area 260 may function substantially similar to evaporation area 160, with the exception that evaporation area 260 may be configured to recover the evaporated water. The evaporation area 260 may comprise an evaporator 264 that may further comprise a plurality of nozzles 265. The nozzles 265 may be configured to emit a plurality of saltwater streams in a substantially circular pattern, which may increase the volume of air that is in contact with the saltwater, which may result in increased evaporation rates. The evaporation area 260 may also comprise a collection pit 262, which may be substantially similar to collection pit 162, except collection pit 262 may be substantially circular to collect salts deposited by the saltwater streams emitted by the evaporator nozzles 265 in a radial pattern. The pattern may be any number of degrees, such as about 90, about 180, or about 360 degrees. The nozzles 265 may each comprise an electric ball valve that is controlled by the weather-monitoring controller 500 as discussed below. Each ball valve may be about two inches wide. The collection pit 262 may have a radius of about 150 feet. A liner covered central berm, which may be about 30 feet wide, may extend radially from the perimeter of the collection pit 262 to the center of the collection pit 262. Piping for the nozzles 265 may extend though the central berm. The distance from the center of the collection pit 262 to the security fence 206 may be about 218 feet. The distance from the center of the collection pit 262 to the berm 208 may be about 202 feet. The evaporation area 260 may also comprise a fan 267, which may aid in increasing the evaporation rate of the saltwater streams. The evaporation area 260 may further comprise a plurality of condenser beams 270, which may support a plurality of condenser panels 266. A condenser beam 270 may be installed in the center of the collection pit 262 and extend vertically into the air. Condenser beams 270 may be installed in the ground along the circumference of the collection pit 262, and may extend in radial lines from the circumference of the collection pit 262 to the center of collection pit 262. The condenser panels 266 may condense the evaporated water vapor and are discussed more fully below. The evaporation area 260 may further comprise a water collection tank 261 in fluid communication with the condenser panels 266 and/or the condenser beams 270 for storing condensed water collected from the condenser panels 266. The evaporation area 260 may further comprise a pump 263 in fluid communication with the condenser panels 266, which may utilize a geothermal system to cool air or other fluids for use in the condenser panels 266. The evaporation area 260 may also comprise a salt screen 268 that may help prevent salt from being removed from the collection area by wind or similar environmental factors. The salt screen 268 may be about 40 feet tall and may be supported by posts that may be about 50 feet tall and driven about 10 feet into the ground. The posts may be class two Chromated Copper Aresenate (CCA) treated poles. The evaporation area 260 may also comprise overflow pipes that may allow excess un-evaporated liquids to flow back into the separation area as needed.

The salt storage area 280 may comprise a storage building. The salt storage building may have a base of about 100 feet by 80 feet positioned on a six inch 4,000 pounds per square inch (PSI) concrete slab. The sidewall of the storage building may comprise 2 feet by 2 feet by 6 feet concrete blocks stacked in three layers and covered with a hot dipped galvanized radius truss fabric structure and two fourteen foot by fourteen foot doors. A ramp may extend between the evaporation area 260 and the salt storage area 280 to assist in the transport of recovered salt. The ramp may be fourteen feet wide and may be composed of concrete with a liner embedment.

Additionally, crossing stairways may be installed across the berms 208 to allow controlled access to station components. The berms 208 and the security fence 206 may be positioned at least twenty four feet apart to provide space for paved access roads to the station components as desired. Security fence gates may be installed to allow for secure vehicular access. The security fence gates may be twenty feet wide.

Figure 16:
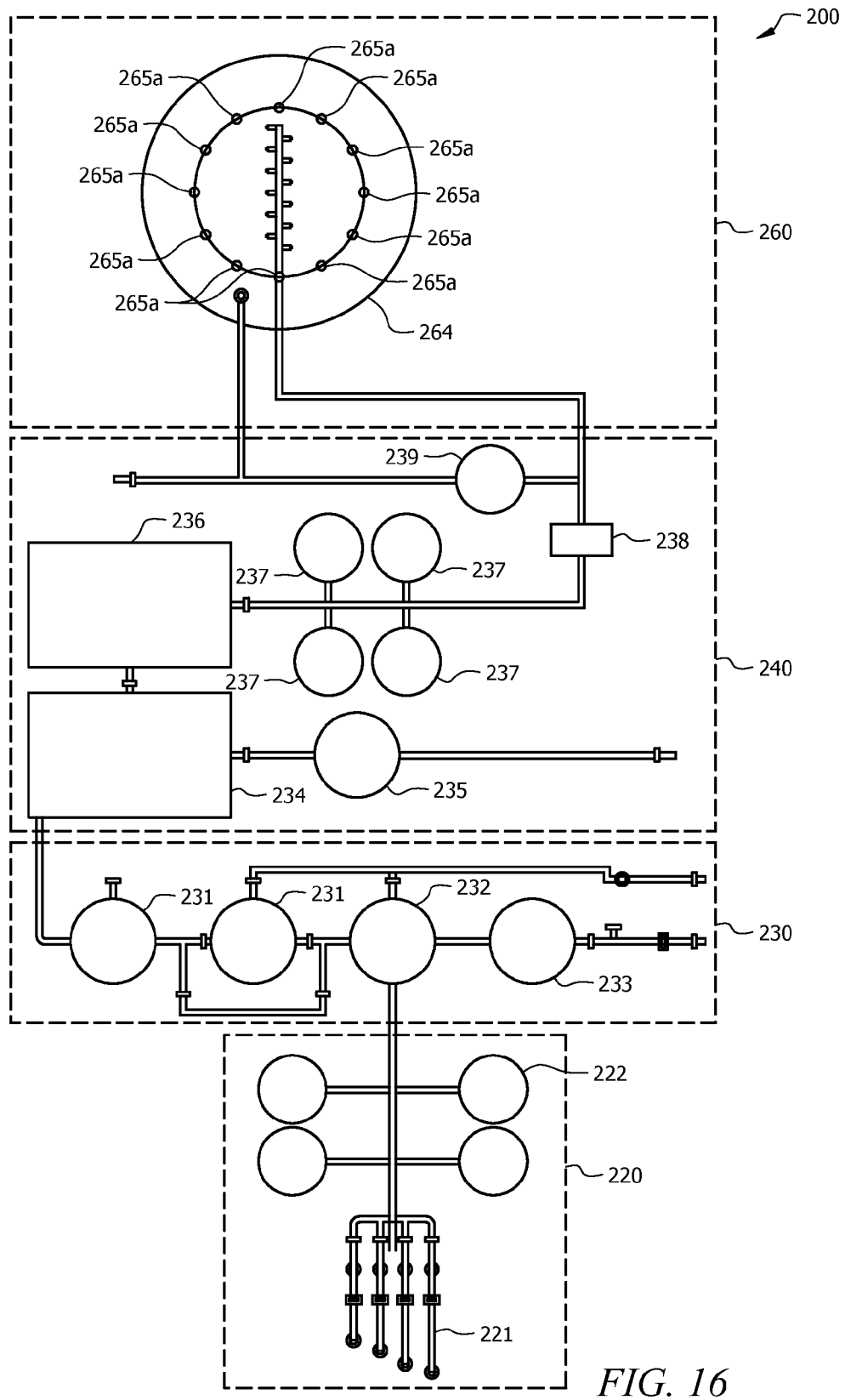
FIG. 16 is a schematic view of the other embodiment of the salt production station.

FIG. 16 depicts another embodiment of production saltwater separation process 200. The reception area 220, the production saltwater storage area 230, the separation area 240, and the evaporation area 260 in FIG. 16 are similar to the reception area 220, the production saltwater storage area 230, the separation area 240, and the evaporation area 260 in FIG. 14, and as such only the differences between FIGS. 14 and 16 need be further described. Specifically, the reception area 220 may contain at least one production saltwater receiving tank (four are shown in FIG. 16) that is configured to store the production saltwater prior to processing in the production saltwater storage area 230 and the separation area 240. In addition, the separation area may contain an iodine separation unit 234. The iodine separation unit 234 may be any piece of process equipment configured to separate iodine from the production saltwater. Typically, one of two separation processes is employed depending on chemistry and temperature of the production saltwater: a chemical-based method using an anion exchange resin as an absorption media to which the iodine anions are attracted; or one or more physical filtration method that separates iodine from the production saltwater using a carbon trap. Several suitable iodine separation units are available from Iofina, PLC of London, England. The iodine separation unit 234 may be configured to operate only when there are sufficient quantities of iodine in the production saltwater to economically justify operation of the iodine isolation unit 234. When not in operation, the production saltwater may be accumulated or routed such that it bypasses the iodine isolation unit 234. The resulting iodine stream is then sent to an iodine solution tank 235 to await transport to another location.

The separation area 240 in FIG. 16 also replaces the settling pits or tanks with a production saltwater clarifying unit 236. The production saltwater clarifying unit 236 may be any piece of equipment configured to remove organic compounds, heavy metals, trace amounts of radioactive materials, and/or any other contaminants from the production saltwater such that the resulting stream consists essentially of water and salt. For example, the production saltwater clarifying unit 236 may employ microbial bioremediation to remove organic compounds, heavy metals, trace amounts of radioactive materials, and/or any other contaminants from the production saltwater. Microbial bioremediation can occur actively (bioaccumulation) and/or passively (biosorption) and may be either aerobic or anaerobic. Microbial bioremediation has been shown to successfully remove numerous metals and other undesirable elements from saltwater, including lead, chromium, arsenic, cobalt, zinc, copper, cadmium, nickel, mercury, uranium, barium, selenium, strontium, plutonium, thorium, technetium, and other elements that show an affinity for sulfur and carbonate. Several suitable bioremediation units are available from the Zeotech Corporation of Fort Worth, Tex.

After the production saltwater leaves the production saltwater clarifying unit 236, it may be stored in at least one saltwater holding tank 237, four of which are shown in FIG. 16. The saltwater may be stored in the saltwater holding tank 237 until a sufficient quantity of saltwater exists to justify and/or environmental conditions are appropriate for operating the evaporation area 260. At such time, a pumping unit 238 pumps the saltwater to the evaporation area 260. Fresh water recovered from the evaporation area 260 (e.g. via the condenser panels described herein) may return to the water return tank 239, where it may be shipped offsite or recycled back to the evaporation area 260 if desired.

Figure 17:
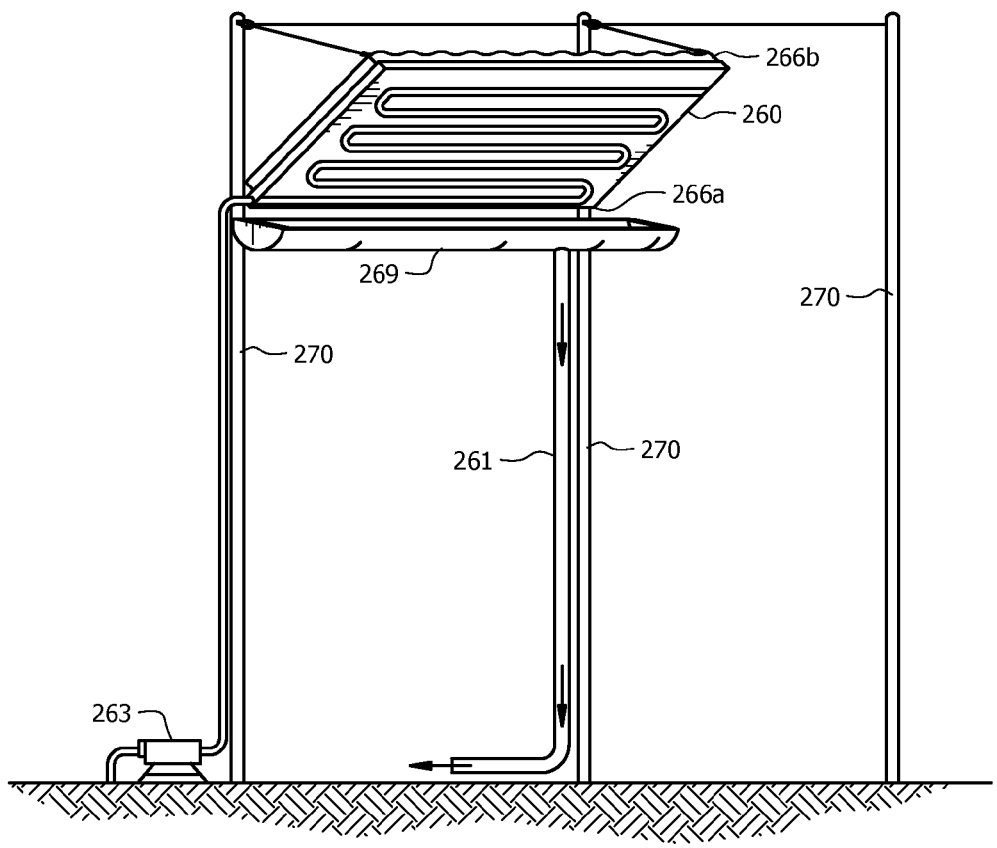
FIG. 17 is a front elevation view of an embodiment of the condenser panels and condenser beams of FIG. 15.

FIG. 17 further depicts the condenser panels 266 and condenser beams 270 of FIG. 15. A condenser panel 266 may comprise a lower edge 266a and an upper edge 266b. The lower edge 266a may be anchored to a condenser beam 270, while the upper edge 266b may be suspended from the condenser beams 270, by rope, wire, chords, bars, or similar materials. The condenser panel 266 may be positioned at an angle relative to the ground to expose a substantial portion of the surface area of the condenser panel 266 to the rising water vapor emitted from the evaporation area 260, while allowing the condensed water on the surface of the condenser panel 266 to flow down the surface of the panel and fall off of the lower edge 266a. The evaporation area 260 may comprise collection gutters 269 suspended between the condenser beams 270 and positioned below the lower edge 266a to collect condensed water flowing from the condenser panel 266 and direct the water flow to the water collection tank 261.

Figure 18:
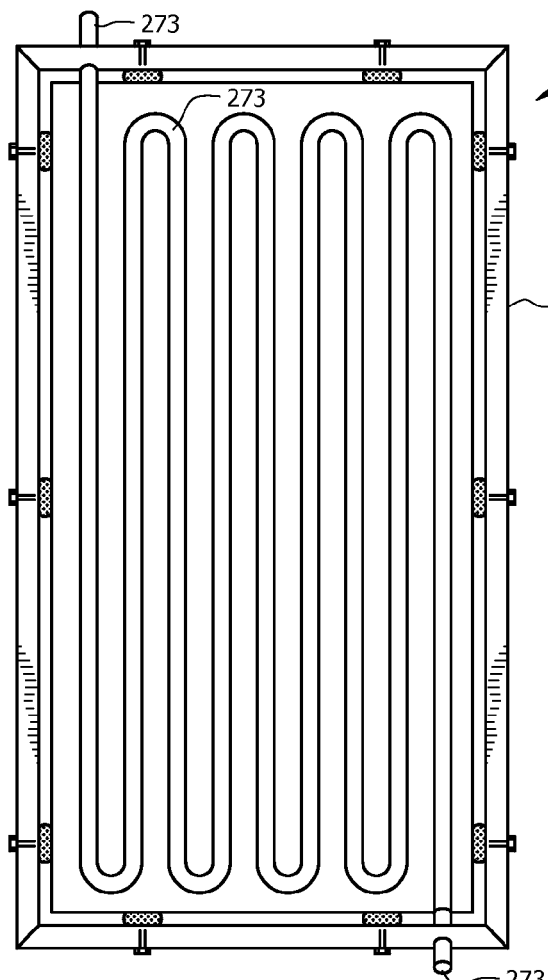
FIG. 18 is a front elevation view of an embodiment of a water condenser panel.
Figure 19:
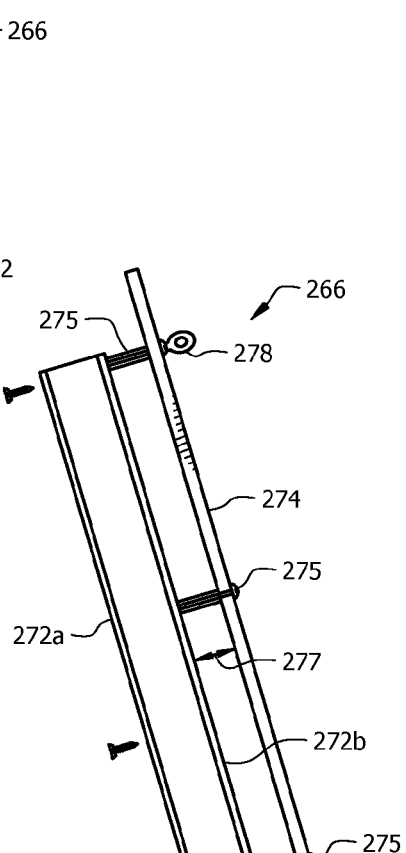
FIG. 19 is a side elevation view of an embodiment of the water condenser panel.

FIGS. 18 and 19 further depict the water condenser panel 266. A water condenser panel 266 may comprise a frame 272 and tubing 273. The frame 272 may be rectangular or another shape and may be large enough to contain the tubing 273 and any necessary water condenser panel 266 parts. The frame 272 may comprise a lower surface 272a and an upper surface 272b. The frame 272 may be constructed of any material durable enough to retain the tubing 273, such as fiberglass, glass, tin, plastic, steel, or any other suitable material or combination thereof. The frame 272 may be constructed of suitable materials to allow thermal conduction between the tubing 273 and the lower surface 272a and/or the upper surface 272b of the frame 272. The tubing 273 may be in pressurized communication with pump 263 (not shown in FIGS. 18 and 19) and/or the tubing of another water condenser panel 266. The tubing 273 may accept relatively low temperature air, water, or other fluid from the pump 263, allow the fluid to cool the lower surface 272a and/or upper surface 272b to a temperature lower than the condensation point of water. Water vapor may condense (i.e. covert from a gaseous phase to a liquid phase) upon coming into contact with the frame 272 due to the reduced temperature caused by the low temperature air in the tubing 273. The frame 272 may be coated with hydrophilic paint to promote condensation.

The water condenser panel 266 may further comprise a reflective panel 274 connected to the frame 272 by one or more spacers 275. The reflective panel 274 may be positioned above the frame 272 and may be constructed from or and/or coated with an opaque material suitable to shade the frame 272 from direct sunlight and related heat. The reflective panel 274 may also be constructed from or and/or coated with a reflective material suitable to reflect sunrays away from the frame 272. The spacers 275 may be of suitable length to create an air gap 277 between the frame 272 and the reflective panel 274. The air gap 277 should be of sufficient distance to create an insulating barrier between the reflective panel 274 and the frame 272 and reduce thermal transference between the reflective panel 274 and the frame 272.

The water condenser panel 266 may further comprise one or more hinges 276 and one or more anchor points 278. The hinges 276 may be attached to a plurality of condenser beams 270. The condenser panel 266 may be suspended from the condenser beams 270 by a cable or similar device attached to the anchor points 278. This configuration allows the lower surface 272a of the frame 272 to be positioned over an evaporation area and adjusted to allow the greatest surface area of the condenser panel 266 to be exposed to water vapor, while allowing the condensed water to flow into collection gutters 269.

Figure 20:
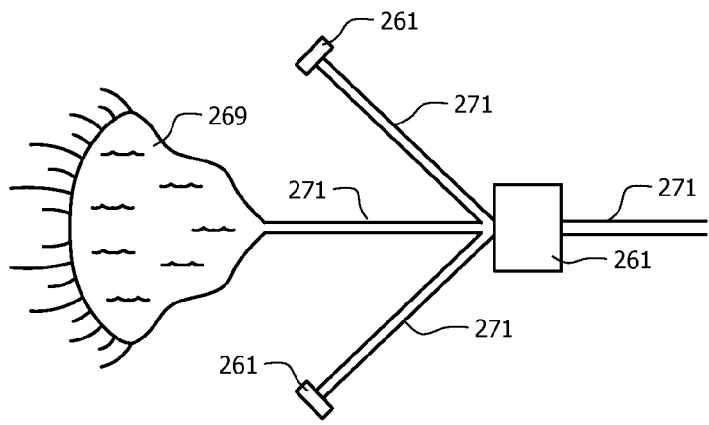
FIG. 20 is a schematic view of an embodiment of a water collection system of the evaporation area of FIG. 15.

FIG. 20 is a schematic view of an embodiment of a water collection system of the evaporation area of FIG. 15. As discussed above, the collection gutters 269 may collect condensed water and direct the water flow to a water collection tank 261. Additionally and/or alternatively, a water collection tank 261 may allow water to flow to and/or from other water collection tanks 261. The water collection tanks 261 may be connected to each other and/or to the collection gutters 269 by piping 271 of sufficient strength, diameter, and length to direct the desired volume of water from the water's source to the water's intended destination.

Figure 21:
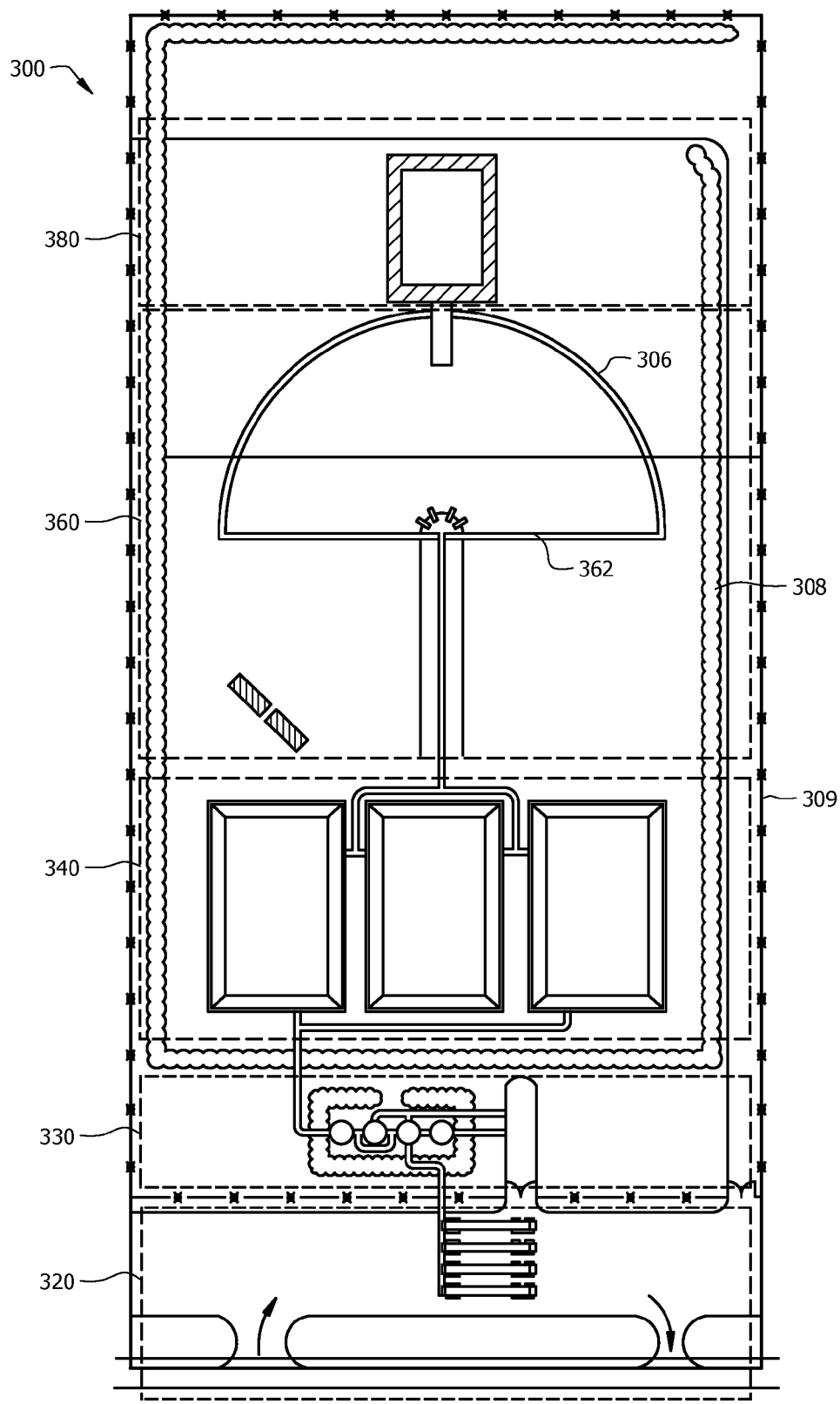
FIG. 21 is a plan view of another embodiment of the salt production station.

FIG. 21 is a plan view of another embodiment of the salt production station 300. The salt production station 300 may comprise substantially the same components as production saltwater separation process 200, but the evaporation area 360 may be arranged in a different configuration. As with the production saltwater separation process 200 the salt production station 300 may comprise a reception area 320, a production saltwater storage area 330, a separation area 340, an evaporation area 360, and a salt storage area 380 arranged as shown in FIG. 21. Production saltwater may be received from trucks or via pipeline at the reception area 320 and stored in the production saltwater storage area 330 for storage and removal of the hydrocarbons. The production saltwater may then flow into the separation area 340 where metals and components other than salt and water are removed. The remaining saltwater may then flow into the evaporation area 360 where the water is separated from the salt via evaporation. The salt is recovered from the ground in the evaporation area 360, and then stored in the salt storage area 380. The salt production station 300 may be surrounded as appropriate by security fence 306, berms 308, and wind-deflecting fencing 309 to provide site security, privacy, fluid containment in case of leaks, and/or wind protection. Unlike production saltwater separation process 200, salt production station 300 may comprise an evaporation area 360 with a collection pit 362 in a semicircular shape. The semicircular shape of collection pit 362 may result in slower evaporation that collection pit 262, and may be employed for salt production station embodiments that accept production saltwater with reduced saltwater yields or with limited production saltwater intake.

Figure 22:
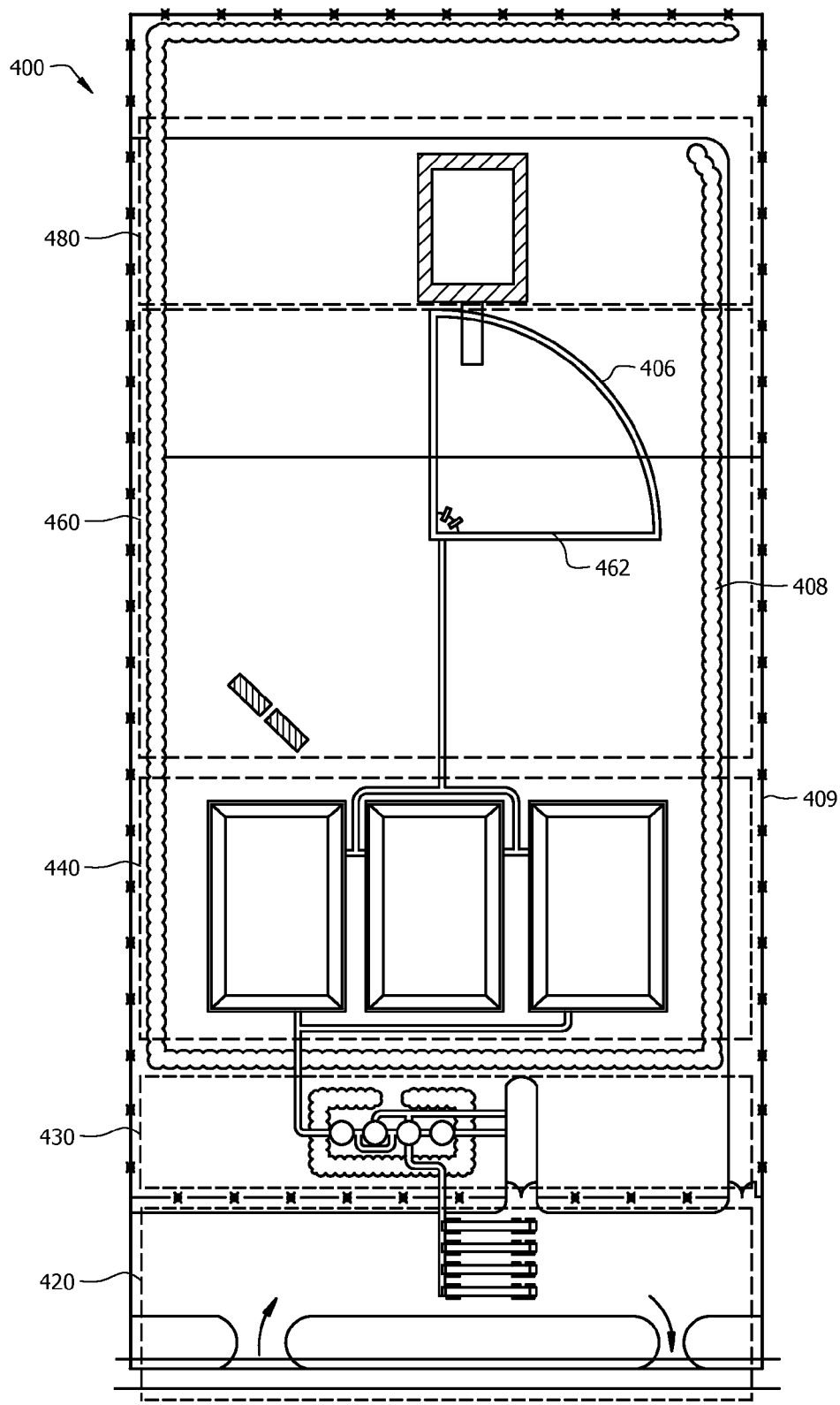
FIG. 22 is a plan view of another embodiment of the salt production station.

FIG. 22 is a plan view of another embodiment of the salt production station 400. The salt production station 400 may comprise substantially the same components as salt production station 300, but the evaporation area 460 may be arranged in a different configuration. As with the salt production station 300 the salt production station 400 may comprise a reception area 420, a production saltwater storage area 430, a separation area 440, an evaporation area 460, and a salt storage area 480 arranged as shown in FIG. 22. Production saltwater may be received from trucks or via pipeline at the reception area 420 and stored in the production saltwater storage area 430 for storage and removal of the hydrocarbons. The production saltwater may then flow into the separation area 440 where metals and components other than salt and water are removed. The remaining saltwater may then flow into the evaporation area 460 where the water is separated from the salt via evaporation. The salt is recovered from the ground in the evaporation area 460, and then stored in the salt storage area 480. The salt production station 400 may be surrounded as appropriate by security fence 406, berms 408, and wind-deflecting fence 409 to provide site security, privacy, fluid containment in case of leaks, and/or wind protection. Unlike salt production station 300, salt production station 400 may comprise an evaporation area 460 with a collection pit 462 in a quarter-circle shape. The quarter circle shape of collection pit 462 may result in slower evaporation than collection pit 362, and may be employed for station embodiments that accept production saltwater with reduced saltwater yields or with limited production saltwater intake. It will also be appreciated that the salt production station 400 may have a combination of evaporation pit geometries. For example, the evaporation pit may have two semicircular areas, or one semicircular are and two quarter-circular areas. The evaporation pit may also be configured with a combination of circular or partial circular sections and rectangular (or any other shape) sections. Also, the wind-deflecting fence 409 may extend completely around or partially around the perimeter of any such collection of pit geometries.

FIG. 23 is a schematic view of an embodiment of a weather-monitoring controller 500. The weather-monitoring controller 500 may be in electrical communication with the components of the production saltwater separation process 200, 300, and 400 and may be configured to halt station processes in response to changing weather conditions. For example, the weather-monitoring controller 500 may be configured to suspend evaporation processes when weather conditions are not optimal for evaporation due to precipitation, high winds, high humidity, low temperature, or high atmospheric pressure. The weather-monitoring controller 500 may also suspend evaporation processes when wind speed is sufficient to blow the saltwater mixture streams or the salt removed from the saltwater out of the collection pit. Specifically, the production saltwater separation process 200, 300, and 400 may comprise a plurality of electric valves that may be open or shut by the weather-monitoring controller 500. Salt production station operators may open or shut the electronic valves to effect or prevent the flow of liquids at the salt production station.

The weather-monitoring controller 500 may comprise a weather server 510 and a weather monitor 520. The weather monitor 520 may be configured detect current humidity, temperature, wind speed, barometric pressure and/or changes thereof and transmit associated date to the weather server 510 over an electrical and/or wireless connection. The weather server 510, which may be electrically connected to shutoff valves installed in the piping in a salt production station and may be configured to selectively close the shutoff valves to stop the fluid flows between the salt production station components and prevent operations in response to data received from the weather monitor 520, such as wind speed and direction, temperature, pressure, dew point/relative humidity, etc. A surge protector 530 may be positioned to break the connection between the weather server 510 and weather monitor 520 to prevent damage to the weather server 510 in case of lightning strikes to the weather monitor 520. The weather server 510 may be connected to one or more display consoles 550 and/or server control systems 560 for viewing the status of the weather or the equipment and for controlling the weather server 510. The display consoles 550 and/or the server control systems 560 may be configured to operate using Weather Master Software produced by Columbia Weather Systems. The weather server 510 may connect to the other weather monitoring controller 500 components through a typical network 570, such as an Ethernet network, and/or through appropriate industry standard interface modules 540 as needed. The network 570 may be configured to accept remote connections 580 through the internet, which may allow salt production station operators to access and manage the weather server 510 and thus the operation of the salt production station from a remote location.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Unless otherwise stated, the term "about" means±10% of the subsequent number. Use of the term "optionally" with respect to any element of a claim means that the element is required, or alternatively, the element is not required, both alternatives being within the scope of the claim. Use of broader terms such as comprises, includes, and having, should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim 1s incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A production saltwater evaporation apparatus, comprising:
   a separation and storage area comprising a hydrocarbon separator configured to separate hydrocarbons from production saltwater and an iodine separation unit configured to remove iodine from the production saltwater and produce saltwater; and
   an evaporator configured to emit a stream of the saltwater along a path in air such that at least some of the water in the saltwater evaporates.

2. The production saltwater evaporation apparatus of claim 1, wherein the iodine separation unit is configured to separate the iodine from the production saltwater using an anion exchange resin as an absorption media.

3. The production saltwater evaporation apparatus of claim 1, wherein the iodine separation unit is configured to separate the iodine from the production saltwater using physical filtration.

4. The production saltwater evaporation apparatus of claim 1, wherein the separation and storage area further comprises a saltwater clarifying unit configured to separate metals from production saltwater to produce the saltwater.

5. The production saltwater evaporation apparatus of claim 1, further comprising a collection area positioned under the path and configured to collect the salt and any remaining water from the saltwater after the at least some water has evaporated, and wherein the saltwater emitted by the evaporator consists essentially of salt and water.

6. The production saltwater evaporation apparatus of claim 1, further comprising a reception area located upstream of the separation and storage area and configured to receive the production saltwater, wherein the production saltwater that is received in the reception area is substantially the same composition as when the production saltwater was located in a subterranean formation.

7. The production saltwater evaporation apparatus of claim 1, wherein the evaporator is configured to emit the stream of the saltwater into the open atmosphere.

8. The production saltwater evaporation apparatus of claim 1, wherein substantially all of the water in the saltwater emitted from the evaporator evaporates in the air.

9. The production saltwater evaporation apparatus of claim 1, further comprising a weather station configured to monitor weather conditions, wherein the evaporator is operated only when the weather conditions are favorable for evaporation of the water.

10. A production saltwater evaporation apparatus, comprising:
    an iodine separation unit configured to remove iodine from the production saltwater;
    a saltwater clarifying unit configured to separate metals from production saltwater and produce saltwater; and
    an evaporator configured to emit a stream of the saltwater into the open atmosphere along a path in air such that at least some of the water in the saltwater evaporates, wherein the evaporator is operated only when weather conditions are favorable for evaporation of the water.

11. The production saltwater evaporation apparatus of claim 10, further comprising a collection area positioned under the path and configured to collect the salt and any remaining water from the saltwater after the at least some water has evaporated, wherein the production saltwater is substantially the same composition as when the production saltwater was located in a subterranean formation.

12. The production saltwater evaporation apparatus of claim 11, further comprising a hydrocarbon separator positioned upstream of the saltwater clarifying unit, wherein the hydrocarbon separator is configured to separate hydrocarbons from the production saltwater.

13. The production saltwater evaporation apparatus of claim 12, wherein the saltwater consists essentially of salt and water.

14. The production saltwater evaporation apparatus of claim 13, further comprising a weather station configured to monitor the weather conditions.

15. A production saltwater evaporation apparatus, comprising:
    an iodine separation unit configured to remove iodine from the production saltwater and produce saltwater; and
    an evaporator configured to emit a stream of the saltwater along a path in air such that at least some of the water in the saltwater evaporates,
    wherein the production saltwater is substantially the same composition as when the production saltwater was located in a subterranean formation.

16. The production saltwater evaporation apparatus of claim 15, further comprising a saltwater clarifying unit configured to separate metals from the saltwater.

17. The production saltwater evaporation apparatus of claim 16, further comprising a collection area positioned under the path and configured to collect the salt and any remaining water from the saltwater after the at least some water has evaporated.

18. The production saltwater evaporation apparatus of claim 17, further comprising:
    a hydrocarbon separator positioned upstream of the saltwater clarifying unit; and
    a weather station configured to monitor weather conditions,
    wherein the evaporator is operated only when the weather conditions are favorable for evaporation of the water,
    wherein the hydrocarbon separator d to separate hydrocarbons from the production saltwater, and
    wherein the saltwater consists essentially of salt and water.

* * * * *

UNITED STATES PATENT AND TRADEMARK OFFICE
CERTIFICATE OF CORRECTION

PATENT NO. : 9,527,003 B2
APPLICATION NO. : 14/660469
DATED : December 27, 2016
INVENTOR(S) : Dennis Hudgens It is certified that error appears in the above-identified patent and that said Letters Patent is hereby corrected as shown below:

In the Claims

Column 20; Line 52, Claim 18 should read:
The production saltwater evaporation apparatus of claim 17, further comprising:
 a hydrocarbon separator positioned upstream of the saltwater clarifying unit; and
 a weather station configured to monitor weather conditions,
  wherein the evaporator is operated only when the weather conditions are favorable for evaporation of the water,
  wherein the hydrocarbon separator is configured to separate hydrocarbons from the production saltwater, and
   wherein the saltwater consists essentially of salt and water.

Signed and Sealed this
Twenty-fifth Day of April, 2017

Michelle K. Lee
*Director of the United States Patent and Trademark Office*